(12) United States Patent
Doi et al.

(10) Patent No.: US 8,545,970 B2
(45) Date of Patent: Oct. 1, 2013

(54) OPTICAL COMPENSATION FILM AND RETARDATION FILM

(75) Inventors: Toru Doi, Mie (JP); Shinji Shimosato, Aichi (JP); Naoto Obara, Mie (JP)

(73) Assignee: Tosoh Corporation, Shunan-shi (JP)

( * ) Notice: Subject to any disclaimer, the term of this patent is extended or adjusted under 35 U.S.C. 154(b) by 1289 days.

(21) Appl. No.: 11/850,396

(22) Filed: Sep. 5, 2007

(65) Prior Publication Data

US 2008/0068545 A1 Mar. 20, 2008

(30) Foreign Application Priority Data

| Sep. 5, 2006 | (JP) | 2006-239767 |
| Oct. 4, 2006 | (JP) | 2006-273046 |
| Nov. 22, 2006 | (JP) | 2006-316322 |
| Jul. 27, 2007 | (JP) | 2007-195756 |

(51) Int. Cl.
*B32B 7/00* (2006.01)
*B32B 7/02* (2006.01)
*B32B 27/06* (2006.01)
*B32B 27/08* (2006.01)
*B32B 27/30* (2006.01)
*G02F 1/1333* (2006.01)
*C08F 22/10* (2006.01)
*C08F 122/10* (2006.01)
*C08F 222/10* (2006.01)

(52) U.S. Cl.
USPC ............ 428/212; 428/1.6; 428/522; 428/523; 428/910; 349/158; 526/321; 526/323.1

(58) Field of Classification Search
None
See application file for complete search history.

(56) References Cited

U.S. PATENT DOCUMENTS

| 5,245,456 A * | 9/1993 | Yoshimi et al. ............... 349/118 |
| 5,440,413 A * | 8/1995 | Kikuchi et al. ............... 349/118 |
| 5,550,661 A * | 8/1996 | Clark et al. ..................... 349/117 |
| 5,594,568 A * | 1/1997 | Abileah et al. ................. 349/120 |
| 5,650,833 A * | 7/1997 | Akatsuka et al. ............. 349/118 |
| 5,657,140 A * | 8/1997 | Xu et al. ........................ 349/118 |
| 5,948,487 A * | 9/1999 | Sahouani et al. .............. 428/1.3 |
| 6,411,344 B2 * | 6/2002 | Fujii et al. ....................... 349/12 |
| 6,542,300 B2 * | 4/2003 | Umemoto ................ 359/487.02 |
| 6,565,974 B1 * | 5/2003 | Uchiyama et al. ............ 428/412 |
| 6,710,830 B2 * | 3/2004 | Yano et al. ...................... 349/96 |
| 6,717,642 B2 * | 4/2004 | Sasaki et al. .................. 349/118 |
| 6,965,474 B2 * | 11/2005 | Johnson et al. .......... 359/489.07 |

(Continued)

FOREIGN PATENT DOCUMENTS

| EP | 1 780 562 A1 | 5/2007 |
| JP | 1-297409 | 11/1989 |

(Continued)

OTHER PUBLICATIONS

Office Action issued Nov. 16, 2010, in Japanese Patent Application No. 2006-239767 filed on Sep. 5, 2006 (with English translation).

(Continued)

*Primary Examiner* — Vivian Chen
(74) *Attorney, Agent, or Firm* — Oblon, Spivak, McClelland, Maier & Neustadt, L.L.P.

(57) ABSTRACT

To provide a retardation film and an optical compensation film which have excellent optical properties and are useful as a compensation film for compensating the contrast and viewing-angle characteristics of liquid-crystal displays and as an antireflection film.

28 Claims, 1 Drawing Sheet

(56) References Cited

U.S. PATENT DOCUMENTS

| | | | |
|---|---|---|---|
| 7,099,083 B2 * | 8/2006 | Johnson et al. | 359/489.07 |
| 7,110,072 B2 * | 9/2006 | Roska et al. | 349/118 |
| 7,132,065 B2 * | 11/2006 | Allen et al. | 264/2.7 |
| 7,158,200 B2 * | 1/2007 | Kuzuhara et al. | 349/117 |
| 7,319,500 B2 * | 1/2008 | Yoshida et al. | 349/96 |
| 7,330,232 B2 * | 2/2008 | Jeon et al. | 349/119 |
| 7,365,816 B2 * | 4/2008 | Kawai et al. | 349/118 |
| 7,405,784 B2 * | 7/2008 | Roska et al. | 349/114 |
| 7,476,425 B2 * | 1/2009 | Obara et al. | 428/1.31 |
| 7,746,424 B2 * | 6/2010 | Kameyama et al. | 349/96 |
| 7,755,730 B2 * | 7/2010 | Saitoh et al. | 349/118 |
| 2005/0059777 A1 * | 3/2005 | Doi | 525/54.23 |
| 2006/0040070 A1 * | 2/2006 | Ito et al. | 428/1.31 |
| 2010/0110353 A1 * | 5/2010 | Doi et al. | 349/118 |

FOREIGN PATENT DOCUMENTS

| | | | |
|---|---|---|---|
| JP | 5-027118 | | 2/1993 |
| JP | 5-100114 | | 4/1993 |
| JP | 5-297223 | | 11/1993 |
| JP | 5-323120 | | 12/1993 |
| JP | 6-88909 | | 3/1994 |
| JP | 10-068816 | | 3/1998 |
| JP | 2818983 | | 8/1998 |
| JP | 2000-111728 | * | 4/2000 |
| JP | 2001-042121 | | 2/2001 |
| JP | 2001-91746 | | 4/2001 |
| JP | 2001-194530 A | | 7/2001 |
| JP | 2001-215332 | * | 8/2001 |
| JP | 2001-215332 A | | 8/2001 |
| JP | 2002-22945 A | | 1/2002 |
| JP | 2002-040258 | * | 2/2002 |
| JP | 2002-40258 A | | 2/2002 |
| JP | 2002-86554 A | | 3/2002 |
| JP | 2002-236216 A | | 8/2002 |
| JP | 2002-333524 | | 11/2002 |
| JP | 2003-090912 | | 3/2003 |
| JP | 2003-215337 A | | 7/2003 |
| JP | 2003-215343 A | | 7/2003 |
| JP | 2003-286319 | | 10/2003 |
| JP | 2003-311823 A | | 11/2003 |
| JP | 2004-163684 A | | 6/2004 |
| JP | 2005-97544 | | 4/2005 |
| JP | 2005-097544 | * | 4/2005 |
| JP | 2005-156862 | * | 6/2005 |
| JP | 2005-156864 | * | 6/2005 |
| JP | 2005-173584 A | | 6/2005 |
| JP | 2005-309339 | * | 11/2005 |
| JP | 2005-331915 A | | 12/2005 |
| JP | 2006-150659 A | | 6/2006 |
| JP | 2006-162748 | * | 6/2006 |
| JP | 2006-193616 | | 7/2006 |
| JP | 2006-201401 | | 8/2006 |
| JP | 2006-208934 A | | 8/2006 |
| JP | 2006-221116 | | 8/2006 |
| JP | 2006-227222 | * | 8/2006 |
| JP | 2006-235576 | | 9/2006 |
| JP | 2006-249318 | | 9/2006 |
| KR | 10-2006-0082814 | | 7/2006 |
| WO | WO 2006/019112 A1 | | 2/2006 |

OTHER PUBLICATIONS

Office Action issued Nov. 16, 2010, in Japanese Patent Application No. 2006-316322 filed on Nov. 22, 2006 (with English translation).
Office Action issued Feb. 1, 2011 in Japan Application No. 2006-316322 (With English Translation).
E. J. Hwang, et al., "Viscoelasticity and Birefringence of Poly(2-Vinylnaphthalene)", Nihon Reoroji Gakkaishi, vol. 22, No. 2, 1994, pp. 129-134 (with English Abstract).
Office Action issued on Sep. 9, 2010, in Korean Patent Application No. 10-2007-0089867 (with English-language translation).
Chinese Office Action issued Sep. 6, 2010, in Patent Application No. 200710149775.5 (with English-language translation).
Communication pursuant to Article 94(3) EPC issued Apr. 15, 2011, European Patent Application No. 07 115 650.9.
Decision of Rejection issued in Japanese Patent Application No. 2006-316322 mailed Jul. 12, 2011 w/English translation.
Notice of Reasons for Rejection issued in Japanese Patent Application No. 2007-195756 mailed Jul. 12, 2011 w/English translation.
Office Action issued in Korean Patent Application No. 10-2007-0089867 mailed Jun. 30, 2011 w/English translation.
Notice of Reasons for Rejection issued Apr. 19, 2011 in Japanese Patent Application No. 2006-316322 (with English translation).
Japanese Office Action issued Jul. 10, 2012, in Japan Patent Application No. 2007-195756 (with English translation).
Korean Office Action issued Jul. 24, 2012, in Korea Patent Application No. 10-2007-0089867 (with English translation).
Office Action issued Jan. 23, 2012, in European Application No. 07 115 650.9-2205.
Office Action issued Nov. 14, 2012, in Japanese Patent Application No. 2011-223981 with English translation.
Korean Office Action issued Jan. 30, 2013, in Korea Patent Application No. 10-2007-0089867 (with English translation).
Combined Taiwanese Office Action and Search Report issued Feb. 7, 2013 in Patent Application No. 096132862 with English Translation and English Translation of Category of Cited Documents.
Office Action issued Mar. 19, 2013 in Japanese Patent Application No. 2011-223981 with English language translation.

* cited by examiner

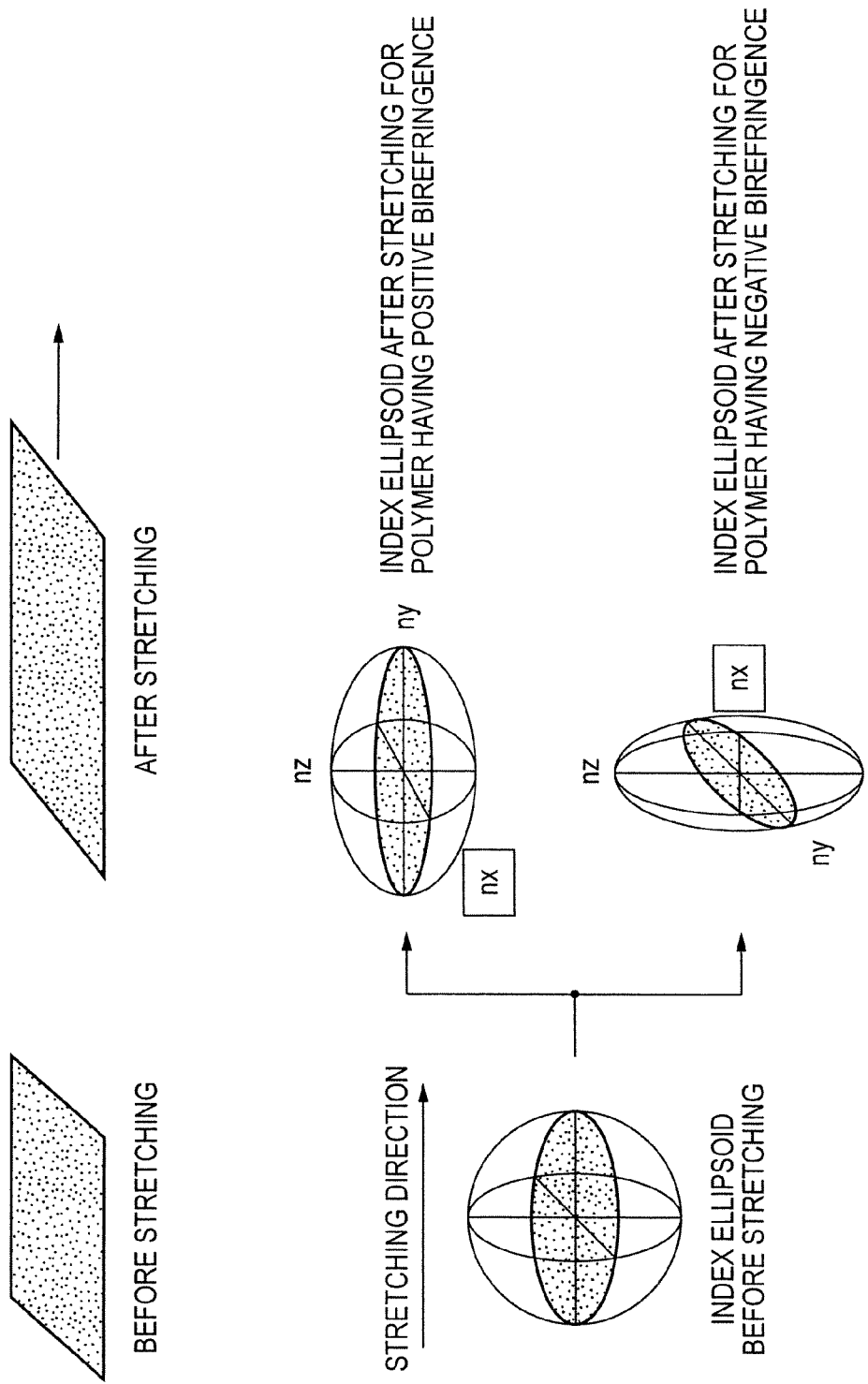

OPTICAL COMPENSATION FILM AND RETARDATION FILM

FIELD OF THE INVENTION

The present invention relates to an optical compensation film and a retardation film which have excellent optical properties, such as a high refractive index in the film thickness direction, a large in-plane retardation, and a small wavelength dependence, and are effective in improving the contrast and viewing-angle characteristics of liquid-crystal displays.

BACKGROUND ART

Liquid-crystal displays are in extensive use as most important display devices in multimedia societies in applications ranging from cell phones to computer monitors, notebook type personal computers, and TVs. Many optical films are used in a liquid-crystal display for improving display characteristics. In particular, retardation films play major roles such as an improvement in contrast for viewing from the front and oblique directions and color tone compensation. Although retardation films made of polycarbonates and polycycloolefins have been used hitherto, these polymers each are a polymer having positive birefringence. The positiveness or negativeness of birefringence is defined in the following manner.

The optical anisotropy of a polymer film which has undergone molecular orientation by, e.g., stretching can be expressed with the index ellipsoid shown in FIG. 1. In the film which has been stretched, the refractive index in a fast-axis direction of the film plane, the refractive index in an in-plane direction perpendicular to the fast-axis direction, and the refractive index in an out-of-plane vertical direction are expressed by nx, ny, and nz, respectively. Incidentally, the fast-axis is an in-plane axial direction in which the refractive index is low.

Negative birefringence means the case where the stretching direction becomes the fast-axis direction, while positive birefringence means the case where a direction perpendicular to the stretching direction becomes the fast-axis direction.

Namely, the uniaxial stretching of a polymer having negative birefringence results in a reduced refractive index in the stretching axis direction (fast-axis: stretching direction), while the uniaxial stretching of a polymer having positive birefringence results in a reduced refractive index in an axial direction perpendicular to the stretching axis direction (fast-axis: direction perpendicular to stretching direction).

Furthermore, in-plane retardation (Re) is expressed as a value obtained by multiplying the value of [refractive index in an in-plane direction perpendicular to the fast-axis direction (ny)]−[refractive index in a fast-axis direction of the film plane (nx)] by the film thickness.

Many polymers have positive birefringence. Polymers having negative birefringence include acrylic resins and polystyrene. However, acrylic resins are low in the ability to develop retardation, and show insufficient properties when used as an optical compensation film. Polystyrene has: a problem concerning retardation stability that it has a large modulus of photoelasticity in a room temperature region and changes in retardation with a slight stress; a problem concerning optical properties that it has a large wavelength dependence of retardation; and a problem concerning practical use that it has low heat resistance. Presently, polystyrene is not in use.

The term wavelength dependence of retardation means that a retardation changes with measuring wavelength. It can be expressed as the ratio of the retardation as measured at a wavelength of 450 nm (R450) to the retardation as measured at a wavelength of 550 nm (R550), i.e., R450/R550. In general, polymers having an aromatic structure highly tend to have a large value of R450/R550, and use of such polymers results in a decrease in contrast in a short-wavelength region and a decrease in viewing angle characteristics.

A stretched film of a polymer showing negative birefringence has a higher refractive index in the film thickness direction and can be a novel optical compensation film. It is hence useful as an optical compensation film for compensating the viewing angle characteristics of displays such as a super twisted nematic liquid-crystal display (STN-LCD), vertical-alignment liquid-crystal display (VA-LCD), in-plane switching liquid-crystal display (IPS-LCD), reflection type liquid-crystal display, and semi-transmissive liquid-crystal display or as an optical compensation film for compensating the viewing-angle characteristics of polarizers. There is a strong desire on the market for an optical compensation film having negative birefringence. Using a polymer having positive birefringence, processes for producing a film have been proposed to produce a film having a heightened refractive index in the thickness direction. One of these is a method of treatment which comprises bonding a heat-shrinkable film to one or each side of a polymer film and stretching the laminate with heating to apply a shrinkage force in the thickness direction for the polymer film (see, for example, patent documents 1 to 3). Also proposed is a method in which a polymer film is uniaxially stretched in an in-plane direction while applying an electric field thereto (see, for example, patent document 4). Furthermore, a retardation film comprising fine particles having negative optical anisotropy and a transparent polymer has been proposed (see, for example, patent document 5). An optical compensation film or optical compensation layer obtained by applying a liquid-crystalline polymer film and causing the polymer to undergo homeotropic orientation has been proposed (see, for example, patent document 6). An optical compensation film having a coating of an aromatic polymer such as polyvinylnaphthalene or polyvinylbiphenyl has also been proposed (see, for example, patent document 7 and non-patent document 1).

Moreover, an optical film comprising a polyvinylcarbazole type polymer has been proposed (see, for example, patent document 8).

A plastic substrate, optical film, and retardation film for displays have been proposed which comprise a fumaric diester resin or a crosslinked fumaric diester resin (see, for example, patent documents 9 and 10).

[Patent Document 1] Japanese Patent No. 2818983
[Patent Document 2] JP-A-05-297223
[Patent Document 3] JP-A-05-323120
[Patent Document 4] JP-A-06-088909
[Patent Document 5] JP-A-2005-156862
[Patent Document 6] JP-A-2002-333524
[Patent Document 7] JP-A-2006-221116
[Patent Document 8] JP-A-2001-91746
[Patent Document 9] JP-A-2005-97544
[Patent Document 10] JP-A-2006-249318
[Non-Patent Document 1] The Society of Rheology, Japan, vol. 22, No. 2 pp. 129-134 (1994)

SUMMARY OF THE INVENTION

However, the methods proposed in patent documents 1 to 4 have a problem that the production steps are highly complicated, resulting in poor productivity. Furthermore, control for attaining, e.g., retardation evenness is exceedingly difficult as compared with conventional control by stretching. In the case where a polycarbonate is used as a base film, the film produced has a large photoelasticity constant at room temperature and has a problem concerning retardation stability that it changes in retardation with a slight stress. This film has other problems, for example, that it has a large wavelength dependence of retardation.

The optical retardation film obtained according to patent document 5 is an optical retardation film having negative birefringence imparted thereto by adding fine particles having negative optical anisotropy. However, from the standpoints of production process simplification and profitability, there is a desire for an optical retardation film for which the addition of fine particles is unnecessary. The method described in patent document 6 has a problem that it is difficult to cause a liquid-crystalline polymer to evenly undergo homeotropic orientation. The techniques described in patent documents 7 and 8 have problems that the film obtained is apt to crack and has high wavelength-dispersability of the retardation.

Although patent document 9 proposes a plastic substrate for displays which comprises a fumaric diester resin, no proposal is made therein on an optical compensation film or retardation film.

In patent document 10, a retardation film is obtained by crosslinking and stretching a fumaric diester resin. This film, however, has a small retardation and has had a problem concerning practical use as a retardation film.

Accordingly, an object of the invention is to provide an optical compensation film or optical compensation layer and a retardation film which are excellent in optical properties and mechanical properties.

The present inventors made intensive investigations in view of the problems described above. As a result, they have found that the problems described above are eliminated with an optical compensation film and a retardation film which comprise a film or layer of a specific resin and in which the three-dimensional refractive indexes of the film or layer satisfy a specific relationship. The invention has been thus completed.

The invention relates to: an optical compensation film or optical compensation layer which is a film or layer comprising a fumaric ester resin, the film or layer having three-dimensional refractive indexes satisfying the relationship nz>ny≥nx, wherein nx is the refractive index in a fast-axis direction of the film plane or layer plane, ny is the refractive index in an in-plane direction perpendicular to the fast-axis direction, and nz is the refractive index in an out-of-plane vertical direction (referred to also as the refractive index in the film thickness direction), the ratio of the retardation as measured at a wavelength of 450 nm to the retardation as measured at a wavelength of 550 nm (R450/R550) being 1.1 or lower (film (A)); an optical compensation film which comprises the film (A) and a film (B) which has three-dimensional refractive indexes satisfying the relationship ny>nx≥nz, wherein nx is the refractive index in a fast-axis direction of the film plane, ny is the refractive index in an in-plane direction perpendicular to the fast-axis direction, and nz is the refractive index in an out-of-plane vertical direction, and which has an in-plane retardation (Re) as measured at a wavelength of 550 nm of 50 nm or larger; a retardation film which is a film comprising a fumaric ester resin and in which when the refractive index in a fast-axis direction of the film plane, the refractive index in an in-plane direction perpendicular to the fast-axis direction, and the refractive index in an out-of-plane vertical direction are expressed by nx, ny, and nz, respectively, the refractive indexes satisfy the relationship nx<ny≤nz; and a retardation film comprising a film (C) which is a film comprising a fumaric ester resin and in which when the refractive index in a fast-axis direction of the film plane, the refractive index in an in-plane direction perpendicular to the fast-axis direction, and the refractive index in an out-of-plane vertical direction are expressed by nx, ny, and nz, respectively, the refractive indexes satisfy the relationship nx<ny≤nz and a film (D) which has three-dimensional refractive indexes satisfying the relationship ny>nx≥nz or ny>nz≥nx, wherein nx is the refractive index in a fast-axis direction of the film plane, ny is the refractive index in an in-plane direction perpendicular to the fast-axis direction, and nz is the refractive index in an out-of-plane vertical direction.

The invention can provide an optical compensation film and a retardation film which have excellent optical properties and are useful as a compensation film for improving the contrast and viewing-angle characteristics of liquid-crystal displays and as an antireflection film.

BRIEF DESCRIPTION OF THE DRAWINGS

FIG. 1 shows changes of a refractive index ellipsoid with stretching.
Numerical References and Signs in Figs. are described.
nx: refractive index in a fast-axis direction of the film plane.
ny: refractive index in an in-plane direction perpendicular to nx.
nz: refractive index in an out-of-plane vertical direction.

DETAILED DESCRIPTION OF THE INVENTION

The optical compensation film and retardation film of the invention will be explained below in detail.

The optical compensation film of the invention is explained first.

The optical compensation film of the invention is an optical compensation film or optical compensation layer which is a film or layer comprising a fumaric ester resin, the film or layer having three-dimensional refractive indexes satisfying the relationship nz>ny≥nx, especially preferably the relationship nz>ny≈nx, wherein nx is the refractive index in a fast-axis direction of the film plane or layer plane, ny is the refractive index in an in-plane direction perpendicular to the fast-axis direction, and nz is the refractive index in an out-of-plane vertical direction, the ratio of the retardation as measured at a wavelength of 450 nm to the retardation as measured at a wavelength of 550 nm (R450/R550) being 1.1 or lower. The refractive index nx in a fast-axis direction of the film plane or layer plane means the refractive index as measured in the direction which is the lowest in refractive index in the film plane or layer plane. The values of nx, ny, and nz can be determined, for example, with a sample inclination type automatic birefringence analyzer.

Although the optical compensation film of the invention is an optical compensation film or layer comprising a fumaric ester resin, this layer comprising a fumaric ester resin means a fumaric ester resin part formed by bonding the fumaric ester resin to, e.g., a substrate.

In general, the three-dimensional refractive indexes of a film are regulated by film stretching or the like and this results in complicated production steps and complicated quality control. In contrast, films made of a fumaric ester resin exhibit such a peculiar behavior that the film in an unstretched state has a higher refractive index in the film thickness direction.

The optical compensation film or optical compensation layer of the invention preferably is one in which the out-of-plane retardation (Rth) represented by the following expression (1), wherein d is the thickness of the film, is from −30 to −2,000 nm. The out-of-plane retardation thereof is especially preferably from −50 to −1,000 nm, even more preferably from −100 to −500 nm.

$$Rth=[(nx+ny)/2-nz]\times d \quad (1)$$

The wavelength dependence of retardation can be expressed by the ratio of the retardation as measured at a wavelength of 450 nm (R450) to the retardation as measured at a wavelength of 550 nm (R550), i.e., the ratio R450/R550. In the optical compensation film or optical compensation layer of the invention, the value of R450/R550 is 1.1 or lower. In particular, that ratio is preferably 1.08 or lower, more preferably 1.05 or lower.

Examples of the fumaric ester resin to be used in the invention include polymers of fumaric esters. Preferred of these is a fumaric ester resin comprising at least 50% by mole fumaric diester residue units represented by formula (a). In particular, a resin in which the proportion of the fumaric diester residue units is 70% by mole or higher is more preferred because it gives an optical compensation film or optical compensation layer excellent in heat resistance and mechanical properties. In especially, the proportion of these units is 80% by mole or higher, and even more preferably, the proportion of these units is 90% by mole or higher.

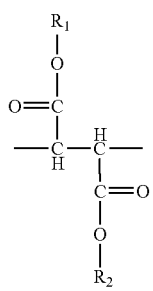

(a)

(In the formula, $R_1$, and $R_2$ each independently represent a branched alkyl or cyclic alkyl group having 3-12 carbon atoms.)

Ester substituents $R_1$ and $R_2$, which independently are a branched alkyl or cyclic alkyl group having 3-12 carbon atoms, in the fumaric diester residue units may have been substituted with a halogen, e.g., fluorine or chlorine, or an ether, ester, or amino group. Examples of $R_1$ and $R_2$ include isopropyl, s-butyl, t-butyl, s-pentyl, t-pentyl, s-hexyl, t-hexyl, cyclopropyl, cyclopentyl, and cyclohexyl. $R_1$ and $R_2$ especially preferably are isopropyl, s-butyl, t-butyl, cyclopentyl, cyclohexyl, or the like because such fumaric diester residue units enable the resin to give an optical compensation film or optical compensation layer excellent in heat resistance and mechanical properties. Isopropyl is more preferred of these because it enables the resin to give an optical compensation film or optical compensation layer having an excellent balance between heat resistance and mechanical properties.

Examples of the fumaric diester residue units represented by formula (a) include a diisopropyl fumarate residue, di-s-butyl fumarate residue, di-t-butyl fumarate residue, di-s-pentyl fumarate residue, di-t-pentyl fumarate residue, di-s-hexyl fumarate residue, di-t-hexyl fumarate residue, dicyclopropyl fumarate residue, dicyclopentyl fumarate residue, and dicyclohexyl fumarate residue. Preferred of these are a diisopropyl fumarate residue, di-s-butyl fumarate residue, di-t-butyl fumarate residue, dicyclopentyl fumarate residue, and dicyclohexyl fumarate residue. Especially preferred is a diisopropyl fumarate residue.

The fumaric ester resin comprising at least 50% by mole fumaric diester residue units represented by formula (a), which is a preferred resin for use as the fumaric ester resin in the invention, is a resin made up of at least 50% by mole fumaric diester residue units represented by formula (a) and up to 50% by mole residue units derived from one or more monomers copolymerizable with fumaric diesters. Examples of the residue units derived from one or more monomers copolymerizable with fumaric diesters include one or more kinds selected from styrene compound residues such as a styrene residue and an α-methylstyrene residue; an acrylic acid residue; acrylic ester residues such as a methyl acrylate residue, ethyl acrylate residue, butyl acrylate residue, 3-ethyl-3-oxetanylmethyl acrylate residue, and tetrahydrofurfuryl acrylate residue; a methacrylic acid residue; methacrylic ester residues such as a methyl methacrylate residue, ethyl methacrylate residue, butyl methacrylate residue, 3-ethyl-3-oxetanylmethyl methacrylate residue, and tetrahydrofurfuryl methacrylate residue; vinyl ester residues such as a vinyl acetate residue and a vinyl propionate residue; an acrylonitrile residue; a methacrylonitrile residue; and olefin residues such as an ethylene residue and a propylene residue. Preferred of these are a 3-ethyl-3-oxetanylmethyl acrylate residue and a 3-ethyl-3-oxetanylmethyl methacrylate residue. Especially preferred is a 3-ethyl-3-oxetanylmethyl acrylate residue.

The fumaric ester resin to be used in the invention preferably is one which has a number-average molecular weight (Mn), as determined from an elution curve obtained by gel permeation chromatography (hereinafter referred to as GPC) through calculation for standard polystyrene, of $1\times10^3$ or higher. In particular, the number-average molecular weight thereof is preferably from $2\times10^4$ to $2\times10^5$ because this resin gives an optical compensation film or optical compensation layer excellent in mechanical properties and in moldability in film formation.

For producing the fumaric ester resin to be used for constituting the optical compensation film or optical compensation layer of the invention, any process may be used as long as the fumaric ester resin is obtained. For example, the resin can be produced by subjecting a fumaric diester optionally together with one or more monomers copolymerizable with the fumaric diester to radical polymerization or radical copolymerization. Examples of this fumaric diester include diisopropyl fumarate, di-s-butyl fumarate, di-t-butyl fumarate, di-s-pentyl fumarate, di-t-pentyl fumarate, di-s-hexyl fumarate, di-t-hexyl fumarate, dicyclopropyl fumarate, dicyclopentyl fumarate, and dicyclohexyl fumarate. Examples of the monomers copolymerizable with the fumaric diester include one or more kinds selected from styrene compounds such as styrene and α-methylstyrene; acrylic acid; acrylic esters such as methyl acrylate, ethyl acrylate, butyl acrylate, 3-ethyl-3-oxetanylmethyl acrylate, and tetrahydrofurfuryl acrylate; methacrylic acid; methacrylic esters such as methyl methacrylate, ethyl methacrylate, butyl methacrylate, 3-ethyl-3-oxetanylmethylmethacrylate, and tetrahydrofurfuryl methacrylate; vinyl esters such as vinyl acetate and vinyl propionate; acrylonitrile; methacrylonitrile; and olefins such as ethylene and propylene. Preferred of these are 3-ethyl-3-oxetanylmethyl acrylate and 3-ethyl-3-oxetanylmethyl methacrylate. Especially preferred is 3-ethyl-3-oxetanylmethyl acrylate.

The radical polymerization can be conducted by known polymerization methods. For example, any of the bulk polymerization method, solution polymerization method, suspension polymerization method, precipitation polymerization method, emulsion polymerization method, and the like can be employed.

Examples of polymerization initiators usable in the radical polymerization include organic peroxides such as benzoyl peroxide, lauryl peroxide, octanoyl peroxide, acetyl peroxide, di-t-butyl peroxide, t-butyl cumyl peroxide, dicumyl peroxide, t-butyl peroxyacetate, t-butyl peroxybenzoate, and t-butyl peroxypivalate; and azo initiators such as 2,2'-azobis (2,4-dimethylvaleronitrile), 2,2'-azobis(2-butyronitrile), 2,2'-azobisisobutyronitrile, dimethyl 2,2'-azobisisobutyrate, and 1,1'-azobis(cyclohexane-1-carbonitrile).

Solvents usable in the solution polymerization method, suspension polymerization method, precipitation polymerization method, and emulsion polymerization are not particularly limited. Examples thereof include aromatic solvents such as benzene, toluene, and xylene; alcohol solvents such as methanol, ethanol, propyl alcohol, and butyl alcohol; cyclohexane; dioxane; tetrahydrofuran (THF); acetone; methyl ethyl ketone; dimethyl formamide; isopropyl acetate; and water. Examples thereof further include mixtures of two or more of these.

The polymerization temperature to be used for the radical polymerization can be suitably determined according to the decomposition temperature of the polymerization initiator. In general, it is preferred to conduct the polymerization at a temperature in the range of 40-150° C.

The optical compensation film of the invention may be an optical compensation film (film (E)) which comprises the optical compensation film or optical compensation layer of the invention (film (A)) and a film (B) which has three-dimensional refractive indexes satisfying the relationship ny>nx≥nz, wherein nx is the refractive index in a fast-axis direction of the film plane, ny is the refractive index in an in-plane direction perpendicular to the fast-axis direction, and nz is the refractive index in an out-of-plane vertical direction and which has an in-plane retardation (Re) as measured at a wavelength of 550 nm and represented by the following expression (2), wherein d is the thickness of the film, of 50 nm or larger.

$$Re=(ny-nx)\times d \qquad (2)$$

Film (B), which is a film having three-dimensional refractive indexes satisfying the relationship ny>nx≥nz, can be obtained, for example, by uniaxially stretching a polymer having positive birefringence.

The polymer constituting film (B) is not particularly limited as long as it is a polymer having positive birefringence. From the standpoints of heat resistance, transparency, etc., preferred examples of such polymers include polycarbonate resins, polyethersulfone resins, polycycloolefin resins, and N-substituted maleimide resins. The in-plane retardation (Re) of film (B) is preferably 50 nm or larger, especially preferably 100 nm or larger, even more preferably 120 nm or larger.

In film (E), the orientation parameter (Nz) represented by the following expression (3) is preferably from −0.1 to 0.95, provided that nx is the refractive index in a fast-axis direction of the film plane, ny is the refractive index in an in-plane direction perpendicular to the fast-axis direction, nz is the refractive index in an out-of-plane vertical direction, and d is the thickness of the film. For viewing angle compensation especially in STN-LCDs, IPS-LCDs, reflection type LCDs, and semi-transmissive LCDs, the Nz of film (E) is preferably 0.40-0.60, more preferably 0.45-0.55. For viewing angle compensation in polarizers, the Nz thereof is preferably from −0.10 to 0.10, especially preferably from −0.05 to 0.05, even more preferably 0-0.05.

$$Nz=(ny-nz)/(ny-nx) \qquad (3)$$

Furthermore, in film (E), the in-plane retardation (Re) represented by expression (2) is preferably 50-1,000 nm, especially preferably 100-500 nm. When film (E) is for use as a quarter-wave plate or a half-wave plate, the in-plane retardation thereof is preferably 130-140 nm or 270-280 nm, respectively.

Processes for producing the optical compensation film comprising a fumaric ester resin, among the optical compensation films according to the invention, are not particularly limited. For example, it can be produced by the solution casting method, melt casting method, or the like.

The solution casting method is a method comprising casting a solution prepared by dissolving a fumaric ester resin in a solvent (hereinafter the solution is referred to as dope) on a supporting base and then removing the solvent by heating, etc. to obtain a film. For casting the dope on a supporting base in this method, use may be made of a technique such as, e.g., the T-die method, doctor blade method, bar coater method, roll coater method, lip coater method, or the like. In particular, the method in most common industrial use is to continuously extrude the dope through a die onto a supporting base in a belt or drum shape. Examples of the supporting base to be used include glass substrates; metal substrates such as stainless-steel substrates and ferrotype substrates; and plastic substrates made of poly(ethylene terephthalate) (PET) and cellulosic resins such as triacetylcellulose (TAC). The thus-obtained film made of a fumaric ester resin may be peeled from the supporting base before use. Alternatively, in the case where the supporting base used is a glass substrate or a plastic substrate, the film can be used in the form of this laminate without being peeled from the substrate. In order for the solution casting method to form a film having high transparency and excellent in thickness precision and surface smoothness, the solution viscosity of the dope is an exceedingly important factor. The viscosity thereof is preferably 700-30, 000 cps, especially preferably 1,000-10,000 cps. On the other hand, the melt casting method is a molding method which comprises melting a fumaric ester resin in an extruder, extruding the melt in a film form through the slit of a T-die, and then hauling the extrudate while cooling it with a roll, air, etc.

Processes for producing the optical compensation film comprising the optical compensation film or optical compensation layer (film (A)) and film (B) are not particularly limited and film (A) is a preferred optical compensation film or optical compensation layer according to the invention. For example, it can be produced by a method in which an unstretched film made of a fumaric ester resin is laminated to a film obtained by uniaxially stretching a film having positive birefringence (hereinafter referred to as process 1) or a method in which a fumaric ester resin is applied to a film obtained by uniaxially stretching a film having positive birefringence (hereinafter referred to as process 2).

Examples of the film having positive birefringence in processes 1 and 2 include films made of polycarbonate resins, polyethersulfone resins, polycycloolefin resins, N-substituted maleimide resins, or the like. This film having positive birefringence is uniaxially stretched, for example, under the conditions of a temperature of 150-200° C., stretching speed of 10-30 mm/min, and stretch ratio of 30-70%, whereby a uniaxially stretched film can be produced from the film having positive birefringence.

In process 1, a film obtained by uniaxially stretching a film having positive birefringence is laminated to an unstretched film made of a fumaric ester resin, whereby the optical compensation film can be produced. In this laminating, a roll-to-roll continuous process, for example, can be used to produce the optical compensation film. For this laminating, a known adhesive can be used.

In process 2, a fumaric ester resin is applied to a film obtained by uniaxially stretching a film having positive birefringence, whereby the optical compensation film can be produced. As a result, an optical compensation film composed of the film obtained by uniaxially stretching a film having positive birefringence and a layer made of the fumaric ester resin is produced. For the application, use may be made of a method which comprises applying a solution (coating solution) prepared by dissolving a fumaric ester resin in a solvent to the film and removing the solvent by heating, etc. For the application, use may be made of a technique such as, e.g., the doctor blade method, bar coater method, gravure coater method, slot die coater method, lip coater method, comma coater method, or the like. Techniques in general industrial use are the gravure coater method for thin-film application and the comma coater method for thick-film application. In order for the solution application to form a coating having high transparency and excellent in thickness precision and surface smoothness, the viscosity of the coating solution is an exceedingly important factor. The viscosity thereof is preferably 10-10,000 cps, especially preferably 10-5,000 cps. The application thickness of the fumaric ester resin for use in the invention (thickness of the layer made of the fumaric ester resin) is determined according to the retardation in the film thickness direction. The thickness thereof on a dry basis is preferably 1-200 μm, especially preferably 10-100 μm. It is possible to subject a surface of the film (B) to an adhesion-facilitating treatment beforehand.

The optical compensation film of the invention may be laminated to itself or to another optical compensation film.

It is preferred that an antioxidant should have been incorporated in the optical compensation film of the invention in order to enhance the thermal stability thereof. Examples of the antioxidant include hindered-phenol antioxidants, phosphorus compound antioxidants, and other antioxidants. These antioxidants may be used alone or in combination of two or more thereof. It is preferred to use a combination of a hindered-phenol antioxidant and a phosphorus compound antioxidant because it performs a synergistically improved antioxidant function. In this case, it is especially preferred to mix and use the two ingredients, for example, in such a proportion that the amount of the phosphorus compound antioxidant is 100-500 parts by weight per 100 parts by weight of the hindered-phenol antioxidant. The amount of the antioxidants to be added is preferably 0.01-10 parts by weight, especially preferably 0.5-1 part by weight, per 100 parts by weight of the fumaric ester resin constituting the optical compensation film of the invention.

An ultraviolet absorber such as, e.g., a benzotriazole, benzophenone, triazine, or benzoate ultraviolet absorber may be incorporated according to need.

The optical compensation film of the invention may be one which contains other ingredients such as a polymer, surfactant, polymer electrolyte, conductive complex, inorganic filler, pigment, dye, antistatic agent, antiblocking agent, and lubricant, as long as this is not counter to the spirit of the invention.

After having been laminated to a polarizer, the optical compensation film of the invention can be used as a circularly or elliptically polarizing plate. The optical compensation film of the invention is useful also as optical compensation films such as a viewing-angle-improving film and color compensation film for liquid-crystal display elements. The circularly polarizing plate may be used as an antireflection film. Furthermore, the optical compensation film can be used as an optical compensation film for improving the viewing-angle characteristics of a brightness-improving film for use in liquid-crystal displays.

The retardation film of the invention is explained next.

Examples of the fumaric ester resin to be used for the retardation film of the invention include polymers of fumaric esters. Preferred of these is a fumaric ester resin comprising at least 50% by mole fumaric diester residue units represented by general formula (a) given above.

The retardation film of the invention is a retardation film which comprises the fumaric ester resin and need not contain fine particles.

The retardation film of the invention is a retardation film which is characterized in that when the refractive index in a fast-axis direction of the film plane, the refractive index in an in-plane direction perpendicular to the fast-axis direction, and the refractive index in an out-of-plane vertical direction are expressed by nx, ny, and nz, respectively, the refractive indexes satisfy the relationship nx<ny≤nz. Since this retardation film satisfies the relationship nx<ny≤nz, it shows the excellent ability to compensate the viewing-angle characteristics of STN-LCDs, IPS-LCDs, reflection type LCDs, semi-transmissive LCDs, and the like.

From the standpoint of enabling the retardation film of the invention to be a retardation film having better optical properties, the in-plane retardation (Re) thereof, as measured at a wavelength of 550 nm and represented by expression (2) given above, is preferably 50-2,000 nm, especially preferably 50-1,000 nm, even more preferably 100-500 nm.

With respect to greater details of the in-plane retardation (Re), when the retardation film of the invention is for use as a retardation film for viewing angle compensation in liquid-crystal displays working in the TN, VA, IPS, or OCB mode, then the in-plane retardation (Re) thereof is preferably 50 nm or larger, especially preferably 100 nm or larger, even more preferably 135 nm or larger.

In the case where the retardation film is to be used as a circularly polarizing film obtained by laminating and uniting the retardation film to a polarizer, then the in-plane retardation (Re) of the film is preferably 100-200 nm. Besides being used as a compensation film for reflection type liquid-crystal displays, the circularly polarizing film is useful as an antireflection film, brightness-improving film, and the like for organic EL displays or the like.

Furthermore, when the retardation film of the invention is to be used as a half-wave film, the in-plane retardation (Re) is preferably 200-400 nm. When it is to be used for viewing angle compensation for a brightness-improving film for liquid-crystal displays working in the STN mode, the in-plane retardation (Re) thereof is preferably 50-1,000 nm.

The wavelength dependence of retardation can be expressed by the ratio of the retardation as measured at a wavelength of 450 nm (R450) to the retardation as measured at a wavelength of 550 nm (R550), i.e., the ratio R450/R550. In the retardation film of the invention, the value of R450/R550 is preferably 1.1 or lower, especially preferably 1.08 or lower, even more preferably 1.05 or lower.

The thickness of the retardation film is in the range of preferably 10-400 μm, especially preferably 20-150 μm, even more preferably 30-100 μm.

Processes for producing the retardation film of the invention are not particularly limited. For example, a process may be used in which a film is formed by, e.g., the solution casting method or melt casting method used for producing the optical compensation film given above and this film is stretched uniaxially or biaxially, whereby the retardation film of the invention which has a regulated retardation can be obtained. Examples of techniques for uniaxial stretching include free-width uniaxial stretching, stretching with a tenter, and stretching between rolls. Examples of techniques for biaxial stretching include stretching with a tenter and stretching by swelling into a tube form. Conditions for the stretching include a stretching temperature of preferably 80-250° C., especially preferably 120-220° C., and a stretch ratio of preferably 1.01-5, especially preferably 1.01-2, because such conditions are less apt to cause thickness unevenness and the retardation film thus obtained is excellent in mechanical properties and optical properties.

It is preferred that an antioxidant should have been incorporated in the retardation film of the invention in order to enhance thermal stability necessary for film formation and the thermal stability of the retardation film itself. Examples of the antioxidant include hindered-phenol antioxidants, phosphorus compound antioxidants, and other antioxidants. These antioxidants may be used alone or in combination of two or more thereof. It is preferred to use a combination of a hindered-phenol antioxidant and a phosphorus compound antioxidant because it performs a synergistically improved antioxidant function. In this case, it is especially preferred to mix and use the two ingredients, for example, in such a proportion that the amount of the phosphorus compound antioxidant is 100-500 parts by weight per 100 parts by weight of the hindered-phenol antioxidant. The amount of the antioxidants to be added is in the range of preferably 0.01-10 parts by weight, especially preferably 0.5-1 part by weight, per 100 parts by weight of the fumaric ester resin constituting the retardation film of the invention.

An ultraviolet absorber such as, e.g., a benzotriazole, benzophenone, triazine, or benzoate ultraviolet absorber may be incorporated according to need.

The retardation film of the invention may be one which contains other ingredients such as a polymer, surfactant, polymer electrolyte, conductive complex, inorganic filler, pigment, dye, antistatic agent, antiblocking agent, and lubricant, as long as this is not counter to the spirit of the invention.

The retardation film of the invention may be a retardation film (film F) comprising: a film (C) which is a film comprising a fumaric ester resin and in which when the refractive index in a fast-axis direction of the film plane, the refractive index in an in-plane direction perpendicular to the fast-axis direction, and the refractive index in an out-of-plane vertical direction are expressed by nx, ny, and nz, respectively, the refractive indexes satisfy the relationship nx<ny≤nz; and a film (D) which has three-dimensional refractive indexes satisfying the relationship ny>nx≥nz or ny>nz≥nx, wherein nx is the refractive index in a fast-axis direction of the film plane, ny is the refractive index in an in-plane direction perpendicular to the fast-axis direction, and nz is the refractive index in an out-of-plane vertical direction.

Examples of the fumaric ester resin to be used for film F include polymers of fumaric esters. Preferred of these is a fumaric ester resin comprising at least 50% by mole fumaric diester residue units represented by general formula (a) given above.

Film (C) used in film F has an in-plane retardation (Re), as measured at a wavelength of 550 nm and represented by expression (2) given above, wherein d is the thickness of the film, of preferably 50-2,000 nm, especially 100-600 nm, more preferably 120-300 nm.

On the other hand, film (D) used in film F has an in-plane retardation (Re), as measured at a wavelength of 550 nm and represented by expression (2) given above, of preferably 50-2,000 nm.

Film (D), which is a film having three-dimensional refractive indexes satisfying the relationship ny>nx≥nz or ny>nz≥nx, can be obtained, for example, by uniaxially stretching a polymer having positive birefringence or by laminating a heat-shrinkable film to one or each side of a polymer having positive birefringence and then uniaxially stretching the laminate. The polymers having positive birefringence are not particularly limited as long as these are polymers having positive birefringence. From the standpoints of heat resistance, transparency, etc., preferred examples of the polymers include polycarbonate resins, polyethersulfone resins, polyarylate resins, polyimide resins, polycycloolefin resins, and N-substituted maleimide resins. Preferred of these are films having high wavelength-dispersion characteristics, such as films of polycarbonate resins and polyethersulfone resins. This is because such resins give a retardation film which especially has reverse wavelength-dispersion characteristics.

In film F, which is a retardation film comprising film (C) and film (D), the angle formed by the fast-axis of film (C) and the fast-axis of film (D) can be set according to purposes. From the standpoints of regulation of wavelength-dispersion characteristics and productivity, that angle is preferably in the range of 90°±20°, especially preferably in the range of 90°±5°, even more preferably 90°.

The in-plane retardation (Re) of the retardation film composed of film (C) and film (D) is the difference in retardation between film (C) and film (D). When this retardation film is to be used as a retardation film having a quarter-wavelength retardation, i.e., as a so-called quarter-wave plate, it is preferred that the difference between the in-plane retardation (Re) of film (C) and the in-plane retardation of film (D) both measured at a wavelength of 550 nm should be 100-160 nm, especially 130-150 nm. When the retardation film is to be used as a retardation film having a half-wavelength retardation, i.e., as a so-called half-wave plate, it is preferred that the difference between the in-plane retardation (Re) of film (C) and the in-plane retardation of film (D) both measured at a wavelength of 550 nm should be 250-300 nm.

The wavelength-dispersion characteristics of film F can be controlled by regulating the retardations of film (C) and film (D). When film F is to be used as a quarter-wave plate or half-wave plate, then the ratio of the retardation as measured at a wavelength of 450 nm (R450) to the retardation as measured at a wavelength of 550 nm (R550), i.e., the ratio R450/R550, is preferably 1.0 or lower, especially preferably 0.99 or lower, even more preferably 0.98 or lower. Furthermore, the ratio of the retardation as measured at a wavelength of 650 nm (R650) to the retardation as measured at a wavelength of 550 nm (R550), i.e., the ratio R650/R550, is preferably 1.0 or higher, especially preferably 1.01 or higher.

Processes for producing film (C) for use in film F are not particularly limited. For example, a process may be used in which a film is formed by, e.g., the solution casting method or melt casting method used for producing the optical compensation film given above and this film is stretched uniaxially or biaxially, whereby film (C) which has a regulated retardation and is for use in the retardation film of the invention can be obtained.

Furthermore, processes for producing film (D) for use in film F are not particularly limited. For example, use may be made of: a process in which a film is formed by, e.g., the solution casting method or melt casting method used for producing the optical compensation film given above and this film is stretched uniaxially or biaxially; or a process in which a heat-shrinkable film is laminated to one or each side of that film and this laminate is stretched uniaxially. Thus, film (D) which has a regulated retardation and is for use in the retardation film of the invention can be obtained.

Examples of techniques for uniaxial stretching include free-width uniaxial stretching, stretching with a tenter, and stretching between rolls. Examples of techniques for biaxial stretching include stretching with a tenter and stretching by swelling into a tube form. Examples of techniques for the uniaxial stretching after the laminating of a heat-shrinkable film include a method in which a heat-shrinkable film is laminated to each or one side of a polymer having positive birefringence by means of adhesiveness of the film itself or with a bonding means, e.g., an easily strippable adhesive, and the resultant laminate is subjected to free-width uniaxial stretching, stretching with a tender, or stretching between rolls. The heat-shrinkable film is stripped off after the stretching. Stretching conditions include a stretching temperature of preferably 80-250° C., especially preferably 120-220° C., and a stretch ratio of preferably 1.01-5, especially preferably 1.01-2, because such conditions are less apt to cause thickness unevenness and the retardation film thus obtained is excellent in mechanical properties and optical properties.

The heat-shrinkable film to be used is not particularly limited. Examples thereof include biaxially stretched films and uniaxially stretched films. In particular, examples thereof include biaxially stretched films and uniaxially stretched films of polyesters, polystyrene, polyethylene, polypropylene, poly(vinyl chloride), and poly(vinylidene chloride).

Film F can be produced, for example, by laminating film (C) to film (D). Methods for the laminating are not particularly limited. Sheet-by-sheet laminating is possible. It is especially preferred that film (C) and film (D) each in a roll-film form be laminated to each other with a known adhesive or the like. The laminating is preferably conducted so that the angle formed by the fast-axis of film (C) and the fast-axis of film (D) is 90°±20°. That angle is preferably 90°±5°, more preferably 90°, because such an angle can be attained by roll-to-roll laminating.

It is also possible to produce film F by molding unstretched films for film (C) and film (D) by coextrusion or another technique and then stretching the laminate.

It is preferred that an antioxidant should have been incorporated in film F in order to enhance thermal stability necessary for film formation and the thermal stability of the retardation film itself. Examples of the antioxidant include hindered-phenol antioxidants, phosphorus compound antioxidants, and other antioxidants. These antioxidants may be used alone or in combination of two or more thereof. It is preferred to use a combination of a hindered-phenol antioxidant and a phosphorus compound antioxidant because it performs a synergistically improved antioxidant function. In this case, it is especially preferred to mix and use the two ingredients, for example, in such a proportion that the amount of the phosphorus compound antioxidant is 100-500 parts by weight per 100 parts by weight of the hindered-phenol antioxidant. The amount of the antioxidants to be added is in the range of preferably 0.01-10 parts by weight, especially preferably 0.5-1 part by weight, per 100 parts by weight of the fumaric ester resin constituting the retardation film of the invention.

An ultraviolet absorber such as, e.g., a benzotriazole, benzophenone, triazine, or benzoate ultraviolet absorber may be incorporated according to need.

Film F may be one which contains other ingredients such as a polymer, surfactant, polymer electrolyte, conductive complex, inorganic filler, pigment, dye, antistatic agent, antiblocking agent, and lubricant, as long as this is not counter to the spirit of the invention.

Film F may be laminated to itself or to another retardation film.

Besides being used as a circularly polarizing film comprising a quarter-wave plate and a polarizer laminated and united thereto or as a retardation film for reflection type liquid-crystal displays, film F is useful as an antireflection film, brightness-improving film, and the like for organic EL displays, touch panels, or the like. Film F may be laminated to a polarizer to produce a composite polarizer.

EXAMPLES

The invention will be explained below in detail by reference to Examples, but the invention should not be construed as being limited by the following Examples in any way. The reagents used were commercial products unless otherwise indicated.

Composition of Fumaric Diester Resin (Fumaric Diester Copolymer):

A nuclear magnetic resonance analyzer (trade name, JNM-GX270; manufactured by JEOL Ltd.) was used to determine the composition by proton nuclear magnetic resonance ($^1$H-NMR) spectroscopy.

Determination of Number-Average Molecular Weight:

A gel permeation chromatograph (GPC) (trade name, HLC-8020; manufactured by Tosoh Corp.) equipped with a column (trade name, TSK-GEL GMH$_{HR}$-H; manufactured by Tosoh Corp.) was used to conduct an examination under the conditions of a column temperature of 40° C. and a flow rate of 1.0 mL/min using THF as a solvent. The molecular weight was determined as a value calculated for standard polystyrene.

Measurement of Glass Transition Temperature (Tg):

A differential scanning calorimeter (trade name, DSC2000; manufactured by Seiko Instruments Inc.) was used to make a measurement at a heating rate of 10° C./min.

Measurement of Light Transmittance and Haze of Film:

The light transmittance and haze of a film produced were measured with a haze meter (trade name, NDH2000; manufactured by Nippon Denshoku Industries Co., Ltd.). The measurement of light transmittance and that of haze were made in accordance with JIS K 7361-1 (1997) and JIS K 7136 (2000), respectively.

Measurement of Refractive Index:

An Abbe refractometer (manufactured by ATAGO) was used to make a measurement in accordance with JIS K 7142 (1981).

Measurement of Three-Dimensional Refractive Indexes and Calculation of Out-Of-Plane Retardation, In-Plane Retardation, and Orientation Parameter:

A sample inclination type automatic birefringence analyzer (trade name, KOBRA-WR; manufactured by Oji Scientific Instruments) was used to measure three-dimensional refractive indexes while changing the angle of elevation. Furthermore, the out-of-plane retardation (Rth), in-plane retardation (Re), and orientation parameter (Nz) were calculated from the three-dimensional refractive indexes.

Judgment Concerning Positiveness/Negativeness of Birefringence;

Whether birefringence was positive or negative was judged using the polarizing microscope described in *Kobunshi Sozai*

*No Henkō Kenbikyō Nyūmon* (Hiroshi Awaya, published by Agune Gijitsu Center, Chapter 5, pp. 78-82 (2001)).

Measurement of Modulus of Photoelasticity;

Measurement was made with an optical rheometer (HRS-100, manufactured by Oak Mfg. Co.) at a pulling rate of 1%/s.

Synthesis Example 1

Production of Fumaric Diester Homopolymer

Into a 30-L autoclave were introduced 18 kg of distilled water containing 0.2% by weight partly saponified poly(vinyl alcohol), 3 kg of diisopropyl fumarate, and 7 g of dimethyl 2,2'-azobisisobutyrate as a polymerization initiator. Suspension radical polymerization reaction was conducted under the conditions of a polymerization temperature of 50° C. and a polymerization time of 24 hours. The particles obtained were taken out by filtration, subsequently sufficiently washed with methanol, and then dried at 80° C. to obtain a diisopropyl fumarate homopolymer. The diisopropyl fumarate homopolymer obtained had a number-average molecular weight of 160,000.

Synthesis Example 2

Synthesis of Fumaric Diester Copolymer

Into a 30-L autoclave equipped with a stirrer, condenser, nitrogen introduction tube, and thermometer were introduced 48 g of hydroxypropyl methyl cellulose (trade name, Metolose 60SH-50; manufactured by Shin-Etsu Chemical Co., Ltd.), 15,601 g of distilled water, 8,161 g of diisopropyl fumarate, 240 g of 3-ethyl-3-oxetanylmethyl acrylate, and 45 g of t-butyl peroxypivalate as a polymerization initiator. Nitrogen bubbling was conducted for 1 hour. Thereafter, the reaction mixture was held at 49° C. for 24 hours with stirring at 200 rpm to thereby conduct radical suspension polymerization. The autoclave was cooled to room temperature, and the suspension containing polymer particles yielded was centrifuged. The polymer particles obtained were washed with distilled water twice and with methanol twice and then vacuum-dried at 80° C. (yield: 80%).

The polymer particles obtained had a number-average molecular weight of 142,000. It was ascertained through $^1$H-NMR spectroscopy that the polymer particles were a diisopropyl fumarate copolymer in which diisopropyl fumarate residue units/3-ethyl-3-oxetanylmethyl acrylate residue units=96/4 (mol %).

Synthesis Example 3

Synthesis of Fumaric Diester Copolymer

Into a 75-mL glass ampul were introduced 69.89 g of diisopropyl fumarate, 0.91 g of 3-ethyl-3-oxetanylmethyl acrylate, and 0.39 g of t-butyl peroxypivalate as a polymerization initiator. After nitrogen displacement, the ampul was evacuated and sealed. The contents were held at 50° C. for 24 hours to thereby conduct radical polymerization. The polymer yielded was cooled to room temperature and then dissolved in tetrahydrofuran. The polymer solution obtained was added to an excess of methanol to thereby obtain a polymer as a white powder. The polymer obtained was washed with methanol three times and then vacuum-dried at 80° C. (yield: 84%).

The polymer obtained had a number-average molecular weight of 171,000. It was ascertained through $^1$H-NMR spectroscopy that the polymer was a diisopropyl fumarate copolymer in which diisopropyl fumarate residue units/3-ethyl-3-oxetanylmethyl acrylate residue units=98/2 (mol %).

Synthesis Example 4

Synthesis of Fumaric Diester Copolymer

Into a 75-mL glass ampul were introduced 68.09 g of diisopropyl fumarate, 3.06 g of 3-ethyl-3-oxetanylmethyl acrylate, and 0.39 g of t-butyl peroxypivalate as a polymerization initiator. After nitrogen displacement, the ampul was evacuated and sealed. The contents were held at 50° C. for 24 hours to thereby conduct radical polymerization. The polymer yielded was cooled to room temperature and then dissolved in tetrahydrofuran. The polymer solution obtained was added to an excess of methanol to thereby obtain a polymer as a white powder. The polymer obtained was washed with methanol three times and then vacuum-dried at 80° C. (yield: 70%).

The polymer obtained had a number-average molecular weight of 179,000. It was ascertained through $^1$H-NMR spectroscopy that the polymer was a diisopropyl fumarate copolymer in which diisopropyl fumarate residue units/3-ethyl-3-oxetanylmethyl acrylate residue units ~94/6 (mol %).

Film Production Example 1

The diisopropyl fumarate homopolymer obtained in Synthesis Example 1 was dissolved in THF to obtain a 22% solution. Thereto were added 0.35 parts by weight of tris(2,4-di-t-butylphenyl) phosphite as a hindered-phenol antioxidant, 0.15 parts by weight of pentaerythritol tetrakis(3-(3,5-di-t-butyl-4-hydroxyphenyl)propionate) as a phosphorus-compound antioxidant, and 1 part by weight of 2-(2H-benzotriazol-2-yl)-p-cresol as an ultraviolet absorber per 100 parts by weight of the diisopropyl fumarate homopolymer. The resultant composition was cast on the supporting base of a solution casting apparatus by the T-die method and dried for 15 minutes at each of 40° C., 80° C., and 120° C. Thus, a film having a width of 250 mm and a thickness of 120 μm was obtained.

The film obtained had a light transmittance of 93%, haze of 0.3%, and refractive index of 1.470.

Film Production Example 2

The diisopropyl fumarate homopolymer obtained in Synthesis Example 1 was dissolved in THF to obtain a 22% solution. Thereto were added 0.35 parts by weight of tris(2,4-di-t-butylphenyl) phosphite as a hindered-phenol antioxidant, 0.15 parts by weight of pentaerythritol tetrakis(3-(3,5-di-t-butyl-4-hydroxyphenyl)propionate) as a phosphorus-compound antioxidant, and 1 part by weight of 2-(2H-benzotriazol-2-yl) p-cresol as an ultraviolet absorber per 100 parts by weight of the diisopropyl fumarate homopolymer. The resultant composition was cast on the supporting base of a solution casting apparatus by the T-die method and dried for 10 minutes at each of 40° C., 80° C., and 120° C. Thus, a film having a width of 250 mm and a thickness of 105 μm was obtained.

The film obtained had a light transmittance of 93%, haze of 0.3%, and refractive index of 1.470.

Film Production Example 3

The diisopropyl fumarate homopolymer obtained in Synthesis Example 1 was dissolved in THF to obtain a 22% solution. This solution was cast on the supporting base of a solution casting apparatus by the T-die method in the same manner as in Film Production Example 1. Thus, a film having a width of 250 mm and a thickness of 124 μm was obtained.

The film obtained had a light transmittance of 93%, haze of 0.3%, and refractive index of 1.470.

Film Production Example 4

A polycarbonate resin (manufactured by Aldrich) was dissolved in methylene chloride to obtain a 25% solution. Thereto were added 0.35 parts by weight of tris(2,4-di-t-butylphenyl) phosphite and 0.15 parts by weight of pentaerythritol tetrakis(3-(3,5-di-t-butyl-4-hydroxyphenyl)propionate) as antioxidants and 1 part by weight of 2-(2H-benzotriazol-2-yl)-p-cresol as an ultraviolet absorber per 100 parts by weight of the polycarbonate resin. The resultant composition was cast on the supporting base of a solution casting apparatus by the T-die method and dried for 15 minutes at each of 40° C., 80° C., and 120° C. Thus, a film having a width of 250 mm and a thickness of 100 μm was obtained.

The film obtained had a light transmittance of 91%, haze of 0.6%, and refractive index of 1.583.

Film Production Example 5

A polycycloolefin resin (polynorbornene having ester groups; manufactured by Aldrich) was dissolved in methylene chloride to obtain 25% solution. Thereto were added 0.35 parts by weight of tris(2,4-di-t-butylphenyl) phosphite and 0.15 parts by weight of pentaerythritol tetrakis(3-(3,5-di-t-butyl-4-hydroxyphenyl)propionate) as antioxidants and 1 part by weight of 2-(2H-benzotriazol-2-yl)-p-cresol as an ultraviolet absorber per 100 parts by weight of the polycycloolefin resin. The resultant composition was cast on the supporting base of a solution casting apparatus by the T-die method and dried for 15 minutes at each of 40° C., 80° C., and 120° C. Thus, a film having a width of 250 mm and a thickness of 100 μm was obtained.

The film obtained had a light transmittance of 92%, haze of 0.4%, and refractive index of 1.510.

Film Production Example 6

A polycarbonate resin (manufactured by Aldrich) was dissolved in methylene chloride to obtain a 25% solution. A film having a width of 250 mm and a thickness of 85 μm was obtained therefrom in the same manner as in Film Production Example 2.

The film obtained had a light transmittance of 91%, haze of 0.5%, and refractive index of 1.583.

Example 1

The diisopropyl fumarate homopolymer obtained in Synthesis Example 1 was dissolved in THF to obtain a 22% solution. Thereto were added 0.35 parts by weight of tris(2,4-di-t-butylphenyl) phosphite as a hindered-phenol antioxidant, 0.15 parts by weight of pentaerythritol tetrakis(3-(3,5-di-t-butyl-4-hydroxyphenyl)propionate) as a phosphorus-compound antioxidant, and 1 part by weight of 2-(2H-benzotriazol-2-yl)-p-cresol as an ultraviolet absorber per 100 parts by weight of the diisopropyl fumarate homopolymer. The resultant composition was cast on the supporting base of a solution casting apparatus by the T-die method and dried for 15 minutes at each of 40° C., 80° C., and 120° C. Thus, a film having a width of 250 mm and a thickness of 21 μm was obtained.

The film obtained had a light transmittance of 93%, haze of 0.3%, and modulus of photoelasticity of $5 \times 10^{-12}$ $Pa^{-1}$. The three-dimensional refractive indexes of the film were: nx=1.4689, ny=1.4689, and nz=1.4723 (nz>ny=nx). The film obtained had an in-plane retardation (Re) of 0 nm and an out-of-plane retardation (Rth) of −71 nm. The retardation ratio (R450/R550) (wavelength dependence) thereof was 1.02. Furthermore, the film obtained had a tensile strength of 50 MPa and a tensile elongation of 12%. It had sufficiently practical mechanical properties.

Those results show that the film obtained had a high thickness-direction refractive index and a small wavelength dependence and was hence suitable for use as an optical compensation film.

Example 2

A film having a width of 250 mm and a thickness of 30 μm was obtained in the same manner as in Example 1.

The film obtained had a light transmittance of 93% and a haze of 0.4%. The three-dimensional refractive indexes of the film were: nx=1.4690, ny=1.4690, and nz=1.4721 (nz>ny=nx). The film obtained had an in-plane retardation (Re) of 0 nm and an out-of-plane retardation (Rth) of −93 nm. The retardation ratio (R450/R550) (wavelength dependence) thereof was 1.02.

Those results show that the film obtained had a high thickness-direction refractive index and a small wavelength dependence and was hence suitable for use as an optical compensation film.

Example 3

The diisopropyl fumarate copolymer obtained in Synthesis Example 2 was dissolved in a solvent composed of toluene and methyl ethyl ketone in a weight ratio of 1:1 to obtain a 20% solution. This solution was cast on the supporting base of a solution casting apparatus by the T-die method and dried for 10 minutes at each of 80° C. and 120° C. Thus, a film having a width of 250 mm and a thickness of 23 μm was obtained.

The film obtained had a light transmittance of 94%, haze of 0.3%, and modulus of photoelasticity of $5 \times 10^{-12}$ $Pa^{-1}$. The three-dimensional refractive indexes of the film were: nx=1.4689, ny=1.4690, and nz=1.4721 (nz>ny≈nx). The film obtained had an in-plane retardation (Re) of 1 nm and an out-of-plane retardation (Rth) of −87 nm. The retardation ratio (R450/R550) (wavelength dependence) thereof was 1.02. Furthermore, the film obtained had a tensile strength of 50 MPa and a tensile elongation of 11%. It had sufficiently practical mechanical properties.

Those results show that the film obtained had a high thickness-direction refractive index and a small wavelength dependence and was hence suitable for use as an optical compensation film.

Example 4

The diisopropyl fumarate copolymer obtained in Synthesis Example 3 was dissolved in a solvent composed of toluene and methyl ethyl ketone in a weight ratio of 1:1 to obtain a 20% solution. This solution was cast on the supporting base of a solution casting apparatus by the T-die method and dried for 10 minutes at each of 80° C. and 120° C. Thus, a film having a width of 250 mm and a thickness of 31 μm was obtained.

The film obtained had a light transmittance of 94%, haze of 0.3%, and modulus of photoelasticity of $5\times10^{-12}$ $Pa^{-1}$. The three-dimensional refractive indexes of the film were: nx=1.4686, ny=1.4687, and nz=1.4727 (nz>ny≈nx). The film obtained had an in-plane retardation (Re) of 1 nm and an out-of-plane retardation (Rth) of −127 nm. The retardation ratio (R450/R550) (wavelength dependence) thereof was 1.02. Furthermore, the film obtained had a tensile strength of 50 MPa and a tensile elongation of 11%. It had sufficiently practical mechanical properties.

Those results show that the film obtained had a high thickness-direction refractive index and a small wavelength dependence and was hence suitable for use as an optical compensation film.

Example 5

The diisopropyl fumarate copolymer obtained in Synthesis Example 4 was dissolved in a solvent composed of toluene and methyl ethyl ketone in a weight ratio of 1:1 to obtain a 20% solution. This solution was cast on the supporting base of a solution casting apparatus by the T-die method and dried for 10 minutes at each of 80° C. and 120° C. Thus, a film having a width of 250 mm and a thickness of 27 μm was obtained.

The film obtained had a light transmittance of 94%, haze of 0.3%, and modulus of photoelasticity of $5\times10^{-12}$ $Pa^{-1}$. The three-dimensional refractive indexes of the film were; nx=1.4687, ny=1.4687, and nz=1.4726 (nz>ny=nx). The film obtained had an in-plane retardation (Re) of 1 nm and an out-of-plane retardation (Rth) of −104 nm. The retardation ratio (R450/R550) (wavelength dependence) thereof was 1.02. Furthermore, the film obtained had a tensile strength of 50 MPa and a tensile elongation of 12%. It had sufficiently practical mechanical properties.

Those results show that the film obtained had a high thickness-direction refractive index and a small wavelength dependence and was hence suitable for use as an optical compensation film.

Comparative Example 1

A methylene chloride solution composed of 25% by weight polycarbonate (trade name, Panlite L1225; manufactured by Teijin Ltd.) and 75% by weight methylene chloride was prepared. This methylene chloride solution was cast on a poly(ethylene terephthalate) film, solidified by volatilizing the solvent, and stripped off to thereby obtain a film. The film thus obtained after stripping was further dried at 100° C. for 4 hours and subsequently at 110° C., 120° C., and 130° C. each for 1 hour and then dried in a vacuum dryer at 120° C. for 4 hours. Thus, a film having a thickness of about 90 μm (hereinafter referred to as film (1)) was obtained.

The film (1) obtained had a glass transition temperature (Tg) of 150° C. It had a light transmittance of 90.0% and a haze of 0.6%. The three-dimensional refractive indexes of the film were; nx=1.5830, ny=1.5830, and nz=1.5830. The film obtained had an in-plane retardation (Re) of 0 nm and an out-of-plane retardation (Rth) of 0 nm.

Those results show that the film obtained did not have a high thickness-direction refractive index and was not suitable for use as an optical compensation film.

Example 6

The film obtained in Comparative Example 1 was cut into a square having a side length of 50 mm. This cut piece was stretched by +50% free-width uniaxial stretching with a biaxially stretching apparatus (manufactured by Imoto Seisakusho) under the conditions of a temperature of 170° C. and a stretching speed of 10 mm/min. The film stretched (referred to as film 1(a)) showed positive birefringence. The three-dimensional refractive indexes of the film 1(a) obtained were: nx=1.5826, ny=1.5842, and nz=1.5822 (ny>nx>nz). The in-plane retardation (Re) thereof was 125 nm.

Furthermore, the film produced in Example 1 was laminated to the film 1(a) to obtain a film having a thickness of 97 μm. The three-dimensional refractive indexes of this film were: nx=1.5593, ny=1.5606, and nz=1.5600. This film had an in-plane retardation (Re) of 126 nm and an orientation parameter (Nz) of 0.5.

Those results show that the film obtained was suitable for use as an optical compensation film.

Example 7

The film obtained in Comparative Example 1 was cut into a square having a side length of 50 mm. This cut piece was stretched by +33% free-width uniaxial stretching with a biaxially stretching apparatus (manufactured by Imoto Seisakusho) under the conditions of a temperature of 170° C. and a stretching speed of 10 mm/min. The film stretched (referred to as film 1(b)) showed positive birefringence. The three-dimensional refractive indexes of the film 1(b) obtained were: nx=1.5826, ny=1.5839, and nz=1.5825 (ny>nx>nz). The in-plane retardation (Re) thereof was 113 nm.

Furthermore, the film produced in Example 2 was laminated to the film 1(b) to obtain a film having a thickness of 113 μm. The three-dimensional refractive indexes of this film were: nx=1.5494, ny=1.5504, and nz=1.5502. This film had an in-plane retardation (Re) of 113 nm and an orientation parameter (Nz) of 0.20.

Those results show that the film obtained was suitable for use as an optical compensation film.

Coating Solution Production Example 1

The diisopropyl fumarate homopolymer obtained in Synthesis Example 1 was dissolved in a solvent composed of toluene and methyl ethyl ketone in a weight ratio of 1:1 to obtain a 10% solution. Thereto were added 0.35 parts by weight of tris(2,4-di-t-butylphenyl) phosphite and 0.15 parts by weight of pentaerythritol tetrakis(3-(3,5-di-t-butyl-4-hydroxyphenyl)propionate) as antioxidants and 1 part by weight of 2-(2H-benzotriazol-2-yl)-p-cresol as an ultraviolet absorber per 100 parts by weight of the diisopropyl fumarate homopolymer. Thus, a coating solution was obtained.

Example 8

The coating solution described above was applied by the doctor blade method to the film 1(a) obtained in Example 6 in such an amount as to result in a thickness on a dry basis (thickness of the layer made of the fumaric ester resin) of 21 μm to obtain a film (film thickness: 96 μm). The three-dimensional refractive indexes of the layer made of the fumaric ester resin were: nx=1.4689, ny=1.4689, and nz=1.4723 (nz>ny=nx).

The three-dimensional refractive indexes of the film were; nx=1.5593, ny=1.5606, and nz=1.5600. This film had an in-plane retardation (Re) of 125 nm and an orientation parameter (Nz) of 0.5.

Those results show that the film obtained was suitable for use as an optical compensation film.

Example 9

The coating solution described above was applied by the doctor blade method to the film 1(b) obtained in Example 7 in such an amount as to result in a thickness on a dry basis (thickness of the layer made of the fumaric ester resin) of 30 μm to obtain a film (film thickness: 112 μm). The three-dimensional refractive indexes of the layer made of the fumaric ester resin were: nx=1.4690, ny=1.4690, and nz=1.4721 (nz>ny=nx).

The three-dimensional refractive indexes of the film were: nx=1.5494, ny=1.5504, and nz=1.5502. This film had an in-plane retardation (Re) of 112 nm and an orientation parameter (Nz) of 0.20.

Those results show that the film obtained was suitable for use as an optical compensation film.

Example 10

The film obtained in comparative Example 1 was cut into a square having a side length of 50 mm. This cut piece was stretched by +50% free-width uniaxial stretching with a biaxially stretching apparatus (manufactured by Imoto Seisakusho) under the conditions of a temperature of 165° C. and a stretching speed of 20 mm/min. The film stretched (referred to as film 1(c)) showed positive birefringence. The three-dimensional refractive indexes of the film 1(c) obtained were: nx=1.5820, ny=1.5851, and nz=1.5819 (ny>nx>nz). The in-plane retardation (Re) thereof was 263 nm.

Furthermore, the coating solution described above was applied by the doctor blade method to the film 1(c) to obtain a film (film thickness: 94 μm). The three-dimensional refractive indexes of the layer made of the fumaric ester resin were: nx=1.4678, ny=1.4678, and nz=1.4744 (nz>ny=nx).

The three-dimensional refractive indexes of the film were: nx=1.5089, ny=1.5117, and nz=1.5094. This film had an in-plane retardation (Re) of 263 nm and an orientation parameter (Nz) of 0.82.

Those results show that the film obtained was suitable for use as an optical compensation film.

Example 11

The film obtained in Comparative Example 1 was cut into a square having a side length of 50 mm. This cut piece was stretched by +50% free-width uniaxial stretching with a biaxially stretching apparatus (manufactured by Imoto Seisakusho) under the conditions of a temperature of 160° C. and a stretching speed of 20 mm/min. The film stretched (referred to as film 1(d)) showed positive birefringence. The film 1(d) obtained had a thickness of 83 μm and the three-dimensional refractive indexes thereof were: nx=1.5813, ny=1.5865, and nz=1.5812 (ny>nx>nz). The in-plane retardation (Re) thereof was 429 nm.

Furthermore, the coating solution described above was applied by the doctor blade method to the film 1(d) to obtain a film (film thickness; 113 μm). The layer made of the fumaric ester resin had a thickness of 30 μm and three-dimensional refractive indexes thereof were: nx=1.4690, ny=1.4690, and nz=1.4721 (nz>ny=nx).

The three-dimensional refractive indexes of the film were: nx=1.5484, ny=1.5522, and nz=1.5494, This film had an in-plane retardation (Re) of 429 nm and an orientation parameter (Nz) of 0.74.

Those results show that the film obtained was suitable for use as an optical compensation film.

Example 12

The film obtained in Comparative Example 1 was cut into a square having a side length of 50 mm. This cut piece was stretched by +60% free-width uniaxial stretching with a biaxially stretching apparatus (manufactured by Imoto Seisakusho) under the conditions of a temperature of 170° C. and a stretching speed of 10 mm/min. The film stretched (referred to as film 1(e)) showed positive birefringence. The film 1(e) obtained had a thickness of 70 μm and the three-dimensional refractive indexes thereof were nx=1.5824, ny=1.5843, and nz=11.5823 (ny>nx>nz). The in-plane retardation (Re) thereof was 133 nm.

Furthermore, the coating solution described above was applied by the doctor blade method to the film 1(e) to obtain a film (film thickness: 113 μm). The three-dimensional refractive indexes of the film were: nx=1.5493, ny=1.5503, and nz=1.5504. This film had an in-plane retardation (Re) of 131 nm and an orientation parameter (Nz) of −0.10.

Those results show that the film obtained was suitable for use as an optical compensation film.

Example 13

The film obtained in Comparative Example 1 was cut into a square having a side length of 50 mm. This cut piece was stretched by +65% free-width uniaxial stretching with a biaxially stretching apparatus (manufactured by Imoto Seisakusho) under the conditions of a temperature of 170° C. and a stretching speed of 10 mm/min. The film stretched (referred to as film 1(f)) showed positive birefringence. The three-dimensional refractive indexes of the film 1(f) obtained were: nx=1.5825, ny=1.5843, and nz=1.5821 (ny>nx>nz). The in-plane retardation (Re) thereof was 137 nm.

Furthermore, the film produced in Example 3 was laminated to the film 1(f) to obtain a film having a thickness of 99 μm. The three-dimensional refractive indexes of the film were; nx=1.5523, ny=1.5537, and nz=1.5530. This film had an in-plane retardation (Re) of 137 nm and an orientation parameter (Nz) of 0.5.

Those results show that the film obtained was suitable for use as an optical compensation film.

Comparative Example 2

The film obtained in Comparative Example 1 was cut into a square having a side length of 50 mm. This cut piece was stretched by +50% free-width uniaxial stretching with a biaxially stretching apparatus (manufactured by Imoto Seisakusho) under the conditions of a temperature of 165° C. and a stretching speed of 10 mm/min (film thickness: 85 μm). The film stretched showed positive birefringence and had an in-plane retardation (Re) of 264 μm. The three-dimensional refractive indexes of the film were; nx=1.5820, ny=1.5851, and nz=1.5819. This film had an orientation parameter (Nz) of 1.02.

Those results show that the film obtained did not have a high thickness-direction refractive index and was not suitable for use as an optical compensation film.

Comparative Example 3

In a nitrogen atmosphere, 9.0 g of poly(2-vinylnaphthalane) (manufactured by Aldrich; weight-average molecular weight, 175,000) was added to 49.6 g of methylene chloride and this mixture was treated at room temperature with a small Disper at 2,500 rpm for 1 hour to dissolve the polymer.

The polymer solution obtained was filtered through a 25-μm filter. Subsequently, this polymer solution was applied by the bar coater method to a PET film having a thickness of 188 μm and then air-dried overnight in a nitrogen stream. Thus, a film of poly(2-vinylnaphthalane) was formed on the PET substrate.

Part of this poly(2-vinylnaphthalane) film was peeled from the PET substrate and examined for film thickness and optical properties. The thickness of the film dried was 58 μm. During the peeling, the film partly broke because of its brittleness.

The three-dimensional refractive indexes of the film obtained were: nx=1.6557, ny=1.6558, and nz=1.6578. The film had an out-of-plane retardation (Rth) of −120.2 nm and a retardation ratio (R450/R550) (wavelength dependence) of 1.12.

Those results show that the film obtained had a large wavelength dependence although satisfying the relationship nz>ny≥nx and was hence unsuitable for use as an optical compensation film.

Comparative Example 4

To N-methyl-2-pyrrolidone (NMP) was added 13.2 g of poly(9-vinylcarbazole) (manufactured by Aldrich; weight-average molecular weight, about 1,100,000). This mixture was treated at room temperature with a small Disper at 6,000 rpm for 1 hour to dissolve the polymer. The polymer solution obtained was filtered through a 25-μm filter. Subsequently, this polymer solution was applied by the bar coater method to a PET film having a thickness of 188 μm and then subjected to hot-air drying at 60° C. for 1 hour and at 100° C. for 15 minutes. Thus, a film of poly(9-vinylcarbazole) was formed on the PET substrate.

Part of this poly(9-vinylcarbazole) film was peeled from the PET substrate and examined for film thickness and optical properties. The thickness of the film dried was 33 μm. During the peeling, the film partly broke because of its brittleness.

The three-dimensional refractive indexes of the film obtained were; nx=1.6819, ny=1.6820, and nz=1.6926. The film had an out-of-plane retardation (Rth) of −350.0 nm and a retardation ratio (R450/R550) (wavelength dependence) of 1.14.

Those results show that the film obtained had a large wavelength dependence although satisfying the relationship nz>ny≥nx and was hence unsuitable for use as an optical compensation film.

Example 14

The film obtained in Film Production Example 1 was cut into a square having a side length of 50 mm. This cut piece was stretched by free-width uniaxial stretching in a stretch ratio of 1.125 with a biaxially stretching apparatus (manufactured by Imoto Seisakusho) under the conditions of a temperature of 140° C. and a stretching speed of 10 mm/min. The film stretched was examined for three-dimensional refractive indexes. As a result, the film had a low refractive index in the stretching axis direction. The film obtained was hence found to have negative birefringence.

From the results of the examination for three-dimensional refractive indexes (nx=1.4681, ny=1.4692, and nz=1.4727), the film obtained was found to satisfy the relationship nx<ny<nz and have a high refractive index in the film thickness direction. The film had an in-plane retardation Re (Re=(ny−nx)×d) as large as 131 nm. It had a retardation ratio (R450/R550) (wavelength dependence) as low as 1.02.

Those results show that the film obtained had negative birefringence, a high thickness-direction refractive index, a large in-plane retardation, and a small wavelength dependence. The film was hence found to be suitable for use as a retardation film.

Example 15

The film obtained in Film Production Example 1 was cut into a square having a side length of 50 mm. This cut piece was stretched by free-width uniaxial stretching in a stretch ratio of 1.25 with a biaxially stretching apparatus (manufactured by Imoto Seisakusho) under the conditions of a temperature of 140° C. and a stretching speed of 100 mm/min. The film stretched was examined for three-dimensional refractive indexes. As a result, the film had a low refractive index in the stretching axis direction. The film obtained was hence found to have negative birefringence.

From the results of the examination for three-dimensional refractive indexes (nx=1.4667, ny=1.4704, and nz=1.4729), the film obtained was found to satisfy the relationship nx<ny<nz and have a high refractive index in the film thickness direction. The film had an in-plane retardation Re (Re=(ny−nx)×d) as large as 418 nm. It had a retardation ratio (R450/R550) (wavelength dependence) as low as 1.02.

Those results show that the film obtained had negative birefringence, a high thickness-direction refractive index, a large in-plane retardation, and a small wavelength dependence. The film was hence found to be suitable for use as a retardation film.

Example 16

The film obtained in Film Production Example 1 was cut into a square having a side length of 50 mm. This cut piece was stretched by free-width uniaxial stretching in a stretch ratio of 1.375 with a biaxially stretching apparatus (manufactured by Imoto Seisakusho) under the conditions of a temperature of 140° C. and a stretching speed of 10 mm/min. The film stretched was examined for three-dimensional refractive indexes. As a result, the film had a low refractive index in the stretching axis direction. The film obtained was hence found to have negative birefringence.

From the results of the examination for three-dimensional refractive indexes (nx=1.4653, ny=1.4714, and nz=1.4733), the film obtained was found to satisfy the relationship nx<ny<nz and have a high refractive index in the film thickness direction. The film had an in-plane retardation Re (Re=(ny−nx)×d) as large as 636 nm. It had a retardation ratio (R450/R550) (wavelength dependence) as low as 1.02.

Those results show that the film obtained had negative birefringence, a high thickness-direction refractive index, a large in-plane retardation, and a small wavelength dependence. The film was hence found to be suitable for use as a retardation film.

Comparative Example 5

The film obtained in Film Production Example 4 was cut into a square having a side length of 50 mm. This cut piece was stretched by free-width uniaxial stretching in a stretch ratio of 1.10 with a biaxially stretching apparatus (manufactured by Imoto Seisakusho) under the conditions of a temperature of 170° C. and a stretching speed of 10 mm/min. The film stretched was examined for three-dimensional refractive indexes. As a result, the film had a low refractive index in the direction perpendicular to the stretching axis direction. The film obtained was hence found to have positive birefringence.

From the results of the examination for three-dimensional refractive indexes (nx=1.5844, ny=1.5823, and nz=1.5823), the film obtained was found to satisfy the relationship nx>ny=nz and not to have a high refractive index in the film thickness direction.

Those results show that the film obtained was not suitable for use as a retardation film having the ability to compensate the viewing-angle characteristics of STN-LCDs and IPS-LCDs.

Comparative Example 6

The film obtained in Film Production Example 5 was cut into a square having a side length of 50 mm. This cut piece was stretched by free-width uniaxial stretching in a stretch ratio of 2.0 with a biaxially stretching apparatus (manufactured by Imoto Seisakusho) under the conditions of a temperature of 180° C. and a stretching speed of 15 mm/min. The film stretched was examined for three-dimensional refractive indexes. As a result, the film had a low refractive index in the direction perpendicular to the stretching axis direction. The film obtained was hence found to have positive birefringence.

From the results of the examination for three-dimensional refractive indexes (nx=1.5124, ny=1.5090, and nz=1.5090), the film obtained was found to satisfy the relationship nx>ny=nz and not to have a high refractive index in the film thickness direction.

Those results show that the film obtained was not suitable for use as a retardation film having the ability to compensate the viewing-angle characteristics of STN-LCDs and IPS-LCDs.

Example 17

The film obtained in Film Production Example 2 was cut into a square having a side length of 50 mm. This cut piece was stretched by free-width uniaxial stretching in a stretch ratio of 1.2 with a biaxially stretching apparatus (manufactured by Imoto Seisakusho) under the conditions of a temperature of 140° C. and a stretching speed of 10 mm/min (hereinafter referred to as film A-1). The film stretched was examined for three-dimensional refractive indexes. From the results of the examination (nx=1.4673, ny=1.4702, and nz=1.4725) (nx<ny<nz), the film obtained was found to have a low refractive index in the stretching axis direction and have negative birefringence. The film had an in-plane retardation Re (Re=(ny−nx)×d) of 283 nm.

The polycarbonate film obtained in Film Production Example 4 was cut into a square having a side length of 50 mm. This cut piece was stretched by free-width uniaxial stretching in a stretch ratio of 1.5 with a biaxially stretching apparatus (manufactured by Imoto Seisakusho) under the conditions of a temperature of 170° C. and a stretching speed of 10 mm/min (hereinafter referred to as film B-1). The three-dimensional refractive indexes of the film obtained were: nx=1.5827, ny=1.5842, and nz=1.5827 (ny>nz=nx). It showed positive birefringence. This film had an in-plane retardation (Re) of 130 nm.

The film A-1 and film B-1 produced above were laminated to each other so that the fast-axes thereof were perpendicular to each other (angle, 90°). The laminated film had a thickness of 186 μm and an in-plane retardation (Re) of 153 nm. The ratio of the retardation as measured at a wavelength of 450 nm (R450) to the retardation as measured at a wavelength of 550 nm (R550), i.e., the ratio R450/R550, was 0.98. Furthermore, the ratio of the retardation as measured at a wavelength of 650 nm (R650) to the retardation as measured at a wavelength of 550 nm (R550), i.e., the ratio R650/R550, was 1.01.

Those results show that the obtained film had controlled wavelength-dispersion characteristics and reverse wavelength-dispersion characteristics and that it was hence suitable for use as a retardation film. It was suitable also as a retardation film having a quarter-wavelength retardation, i.e., as a so-called quarter-wave plate.

Example 18

The film obtained in Film Production Example 3 was cut into a square having a side length of 50 mm. This cut piece was stretched by free-width uniaxial stretching in a stretch ratio of 1.25 with a biaxially stretching apparatus (manufactured by Imoto Seisakusho) under the conditions of a temperature of 160° C. and a stretching speed of 10 mm/min (hereinafter referred to as film A-2). The film stretched was examined for three-dimensional refractive indexes. From the results of the examination (nx=1.4660, ny=1.4709, and nz=1.4731) (nx<ny<nz), the film obtained was found to have a low refractive index in the stretching axis direction and have negative birefringence. The film had an in-plane retardation Re (Re=(ny−nx)×d) of 531 nm.

The polycarbonate film obtained in Film Production Example 6 was cut into a square having a side length of 50 mm. This cut piece was stretched by free-width uniaxial stretching in a stretch ratio of 1.5 with a biaxially stretching apparatus (manufactured by Imoto Seisakusho) under the conditions of a temperature of 160° C. and a stretching speed of 20 mm/min (hereinafter referred to as film B-2). The three-dimensional refractive indexes of the film obtained were: nx=1.5811, ny=1.5863, and nz=1.5819 (ny>nz>nx). It showed positive birefringence. This film had an in-plane retardation (Re) of 395 nm.

The film A-2 and film B-2 produced above were laminated to each other so that the fast-axes thereof were perpendicular to each other (angle, 90°). The laminated film had a thickness of 185 μm and an in-plane retardation (Re) of 136 nm. The ratio of the retardation as measured at a wavelength of 450 nm (R450) to the retardation as measured at a wavelength of 550 mm (R550), i.e., the ratio R450/R550, was 0.91. Furthermore, the ratio of the retardation as measured at a wavelength of 650 nm (R650) to the retardation as measured at a wavelength of 550 nm (R550), i.e., the ratio R650/R550, was 1.07.

Those results show that the obtained film had controlled wavelength-dispersion characteristics and reverse wavelength-dispersion characteristics and that it was hence suitable for use as a retardation film. It was suitable also as a retardation film having a quarter-wavelength retardation, i.e., as a so-called quarter-wave plate.

Example 19

The film obtained in Film Production Example 6 was cut into a square having a side length of 50 mm. This cut piece was stretched by free-width uniaxial stretching in a stretch ratio of 1.5 with a biaxially stretching apparatus (manufactured by Imoto Seisakusho) under the conditions of a temperature of 165° C. and a stretching speed of 20 mm/min (hereinafter referred to as film B-3). The three-dimensional refractive indexes of the film obtained were; nx=1.5820, ny=1.5849, and nz=1.5819 (ny>nx>nz). It showed positive birefringence. This film had an in-plane retardation (Re) of 261 nm.

The film A-2 produced in Example 18 and the film B-3 produced above were laminated to each other so that the fast-axes thereof were perpendicular to each other (angle, 90°). The laminated film had a thickness of 199 μm and an in-plane retardation (Re) of 270 nm. The ratio of the retardation as measured at a wavelength of 450 nm (R450) to the retardation as measured at a wavelength of 550 nm (R550), i.e., the ratio R450/R550, was 0.97. Furthermore, the ratio of the retardation as measured at a wavelength of 650 nm (R650) to the retardation as measured at a wavelength of 550 nm (R550), i.e., the ratio R650/R550, was 1.03.

Those results show that the obtained film had controlled wavelength-dispersion characteristics and reverse wavelength-dispersion characteristics and that it was hence suitable for use as a retardation film. It was suitable also as a retardation film having a half-wavelength retardation, i.e., as a so-called half-wave plate.

Example 20

A commercial PES film (manufactured by Lonza) was cut into a square having a side length of 50 mm. This cut piece was stretched by free-width uniaxial stretching in a stretch ratio of 1.5 with a biaxially stretching apparatus (manufactured by Imoto Seisakusho) under the conditions of a temperature of 245° C. and a stretching speed of 20 mm/min (hereinafter referred to as film B-4). The three-dimensional refractive indexes of the film obtained were: nx-1.6587, ny=1.6611, and nz=1.6587 (ny>nz=nx). It showed positive birefringence. This film had in-plane retardation (Re) of 149 nm.

The film A-1 produced in Example 17 and the film B-4 produced above were laminated to each other so that the fast-axes thereof were perpendicular to each other (angle, 90°). The laminated film had a thickness of 161 μm and an in-plane retardation (Re) of 134 nm. The ratio of the retardation as measured at a wavelength of 450 nm (R450) to the retardation as measured at a wavelength of 550 nm (R550), i.e., the ratio R450/R550, was 0.94. Furthermore, the ratio of the retardation as measured at a wavelength of 650 nm (R650) to the retardation as measured at a wavelength of 550 nm (R550), i.e., the ratio R650/R550, was 1.03.

Those results show that the obtained film had controlled wavelength-dispersion characteristics and reverse wavelength-dispersion characteristics and that it was hence suitable for use as a retardation film. It was suitable also as a retardation film having a quarter-wavelength retardation, i.e., as a so-called quarter-wave plate.

Example 21

The film obtained in Film Production Example 3 was cut into a square having a side length of 50 mm. This cut piece was stretched by free-width uniaxial stretching in a stretch ratio of 1.5 with a biaxially stretching apparatus (manufactured by Imoto Seisakusho) under the conditions of a temperature of 140° C. and a stretching speed of 10 mm/min (hereinafter referred to as film A-3). The film stretched was examined for three-dimensional refractive indexes. From the results of the examination (nx=1.4671, ny=1.4702, and nz=1.4725) (nx<ny<nz), the film obtained was found to have a low refractive index in the stretching axis direction and have negative birefringence. The film had an in-plane retardation Re (Re=(ny−nx)×d) of 312 nm.

The polycarbonate film obtained in Film Production Example 4 was cut into a square having a side length of 50 mm. This cut piece was stretched by free-width uniaxial stretching in a stretch ratio of 1.5 with a biaxially stretching apparatus (manufactured by Imoto Seisakusho) under the conditions of a temperature of 170° C. and a stretching speed of 10 mm/min (hereinafter referred to as film B-5). The three-dimensional refractive indexes of the film obtained were: nx=1.5827, ny=1.5842, and nz=1.5827 (ny>nz=nx). It showed positive birefringence. This film had an in-plane retardation (Re) of 130 nm.

The film A-3 and film B-5 produced above were laminated to each other so that the fast-axes thereof were perpendicular to each other (angle, 90°). The laminated film had a thickness of 177 μm and an in-plane retardation (Re) of 183 nm. The ratio of the retardation as measured at a wavelength of 450 nm (R450) to the retardation as measured at a wavelength of 550 nm (R550), i.e., the ratio R450/R550, was 0.96. Furthermore, the ratio of the retardation as measured at a wavelength of 650 nm (R650) to the retardation as measured at a wavelength of 550 nm (R550), i.e., the ratio R650/R550, was 1.06.

Those results show that the obtained film had controlled wavelength-dispersion characteristics and reverse wavelength-dispersion characteristics and that it was hence suitable for use as a retardation film. It was suitable also as a retardation film having a quarter-wavelength retardation, i.e., as a so-called quarter-wave plate.

Example 22

The film A-3 and film B-5 produced in Example 21 were laminated to each other so that the angle formed by the fast-axes thereof was 80°. The laminated film had an in-plane retardation (Re) of 181 nm. The ratio of the retardation as measured at a wavelength of 450 nm (R450) to the retardation as measured at a wavelength of 550 nm (R550), i.e., the ratio R450/R550, was 0.97. Furthermore, the ratio of the retardation as measured at a wavelength of 650 nm (R650) to the retardation as measured at a wavelength of 550 nm (R550), i.e., the ratio R650/R550, was 1.03.

Those results show that the obtained film had controlled wavelength-dispersion characteristics and reverse wavelength-dispersion characteristics and that it was hence suitable for use as a retardation film. It was suitable also as a retardation film having a quarter-wavelength retardation, i.e., as a so-called quarter-wave plate.

Example 23

The film A-3 and film B-5 produced in Example 21 were laminated to each other so that the angle formed by the fast-axes thereof was 70°. The laminated film had an in-plane retardation (Re) of 181 nm. The ratio of the retardation as measured at a wavelength of 450 nm (R450) to the retardation as measured at a wavelength of 550 nm (R550), i.e., the ratio R450/R550, was 0.98. Furthermore, the ratio of the retardation as measured at a wavelength of 650 nm (R650) to the retardation as measured at a wavelength of 550 nm (R550), i.e., the ratio R650/R550, was 1.02.

Those results show that the obtained film had controlled wavelength-dispersion characteristics and reverse wavelength-dispersion characteristics and that it was hence suitable for use as a retardation film. It was suitable also as a retardation film having a quarter-wavelength retardation, i.e., as a so-called quarter-wave plate.

Comparative Example 7

The film B-1 produced in Example 15 had an in-plane retardation (Re) of 130 nm. The ratio of the retardation as measured at a wavelength of 450 nm (R450) to the retardation as measured at a wavelength of 550 nm (R550), i.e., the ratio R450/R550, was 1.08. Furthermore, the ratio of the retardation as measured at a wavelength of 650 nm (R650) to the retardation as measured at a wavelength of 550 nm (R550), i.e., the ratio R650/R550, was 0.96.

The film was poor in reverse wavelength-dispersion characteristics because of the nonuse of film (A).

While the invention has been described in detail and with reference to specific embodiments thereof, it will be apparent to one skilled in the art that various changes and modifications can be made therein without departing from the scope thereof.

This application is based on Japanese patent application No. 2006-239767 filed on Sep. 5, 2006, Japanese patent application No. 2006-273046 filed on Oct. 4, 2006, Japanese patent application No. 2006-316322 filed on Nov. 22, 2006, Japanese patent application No. 2007-195756 filed on Jul. 27, 2007, the entire contents thereof being hereby incorporated by reference.

What is claimed is:

1. An optical compensation film or an optical compensation layer, which is a film or a layer comprising a fumaric ester resin, wherein the film or the layer has three-dimensional refractive indexes satisfying the relationship nz>ny≥nx, wherein nx is the refractive index in a fast-axis direction of the film plane or the layer plane, ny is the refractive index in an in-plane direction perpendicular to the fast-axis direction, and nz is the refractive index in an out-of-plane vertical direction,
wherein a ratio of the retardation R450/R550 as measured at a wavelength of 450 nm to the retardation as measured at a wavelength of 550 nm is 1.1 or lower, and
wherein the optical compensation film or the optical compensation layer does not comprise fine particles.

2. The optical compensation film or the optical compensation layer according to claim 1, wherein the film or the layer has an out-of-plane retardation Rth of −30 to −2,000 nm represented by the following expression (1), wherein d is a thickness of the film or the layer $$Rth=[(nx+ny)/2-nz]\times d \quad (1).$$

3. An optical compensation film comprising:
the optical compensation film or the optical compensation layer of claim 1, which is a film (A), and
a film (B) which has three-dimensional refractive indexes satisfying the relationship ny>nx≥nx for the film (B), wherein nx is the refractive index in a fast-axis direction of the film plane, ny is the refractive index in an in-plane direction perpendicular to the fast-axis direction, and nz is the refractive index in an out-of-plane vertical direction,
wherein the film (B) has an in-plane retardation Re as measured at a wavelength of 550 nm and represented by the following expression (2), wherein d is a thickness of the film $$Re=(ny-nx)\times d \quad (2),$$

wherein the in-plane retardation Re is from 50 to 2,000 nm.

4. The optical compensation film according to claim 3, which has an orientation parameter Nz represented by the following expression (3) in a range of −0.1 to 0.95

$$Nz=(ny-nz)/(ny-nx) \quad (3).$$

5. The optical compensation film according to claim 3 or 4, wherein the in-plane retardation Re represented by the expression (2) is from 50 to 1,000 nm.

6. The optical compensation film or optical compensation layer according to claim 1 or 2, which is for use in a liquid-crystal display element.

7. A process for producing the optical compensation film according to claim 3 or 4, which comprises laminating an unstretched film comprising a fumaric ester resin to a film obtained by uniaxially stretching a film having a positive birefringence.

8. A process for producing the optical compensation film according to claim 3 or 4, which comprises applying a fumaric ester resin to a film obtained by uniaxially stretching a film having a positive birefringence.

9. The optical compensation film according to claim 3 or 4, which is for use in a liquid-crystal display element.

10. A retardation film which comprises a fumaric ester resin, wherein when the refractive index in a fast-axis direction of the film plane, the refractive index in an in-plane direction perpendicular to the fast-axis direction, and the refractive index in an out-of-plane vertical direction are expressed by nx, ny, and nz, respectively, the refractive indexes satisfy the relationship nx<ny≤nz,
wherein the retardation film does not comprise fine particles.

11. The retardation film according to claim 10, which has an in-plane retardation Re form 50 to 2,000 nm as measured at a wavelength of 550 nm and represented by the expression (2)

$$Re=(ny-nx)\times d,$$

wherein nx is the refractive index in a fast-axis direction of the film plane, ny is the refractive index in an in-plane direction perpendicular to the fast-axis direction, and d is a thickness of the film.

12. The retardation film according to claim 10 or 11, wherein a ratio of the retardation R450/R550 as measured at a wavelength of 450 nm to the retardation as measured at a wavelength of 550 nm is 1.1 or lower.

13. A composite polarizer which comprises a polarizer and the retardation film of claim 12 laminated to the polarizer.

14. A retardation film comprising:
a film (C) which comprises a fumaric ester resin and wherein, when the refractive index in a fast-axis direction of the film plane, the refractive index in an in-plane direction perpendicular to the fast-axis direction, and the refractive index in an out-of-plane vertical direction are expressed by nx, ny, and nz, respectively, the refractive indexes satisfy the relationship nx<ny≤nz; and
a film (D) which has three-dimensional refractive indexes satisfying the relationship ny>nx≥nz or ny>nz≥nx, wherein nx is the refractive index in a fast-axis direction of the film plane, ny is the refractive index in an in-plane direction perpendicular to the fast-axis direction, and nz is the refractive index in an out-of-plane vertical direction.

15. The retardation film according to claim 14, wherein the film (D) has an in-plane retardation Re from 50 to 2,000 nm as measured at a wavelength of 550 nm and represented by the expression (2)

$$Re=(ny-nx)\times d,$$

wherein nx is the refractive index in a fast-axis direction of the film plane, ny is the refractive index in an in-plane direction perpendicular to the fast-axis direction, and d is a thickness of the film.

16. The retardation film according to claim 14, wherein the fast-axis of the film (C) forms an angle of 90°±20° with the fast-axis of the film (D).

17. The retardation film according to claim 14, wherein a ratio of the retardation R450/R550 as measured at a wavelength of 450 nm to the retardation as measured at a wavelength of 550 nm is 1.0 or lower.

18. The retardation film according to claim 14 or 15, wherein the film (C) has an in-plane retardation Re from 50 to 2,000 nm as measured at a wavelength of 550 rim and represented by the expression (2)

$$Re=(ny-nx)\times d,$$

wherein nx is the refractive index in a fast-axis direction of the film plane, ny is the refractive index in an in-plane direction perpendicular to the fast-axis direction, and d is a thickness of the film.

19. A composite polarizer which comprises a polarizer and the retardation film of claim 18 laminated to the polarizer.

20. The retardation film according to claim 14 or 16, wherein the difference between the in-plane retardation Re of the film (C) and the in-plane retardation Re of the film (D), both measured at a wavelength of 550 nm, is from 100 to 160 nm.

21. A composite polarizer which comprises a polarizer and the retardation film of claim 20 laminated to the polarizer.

22. The retardation film according to claim 14 or 16, wherein the difference between the in-plane retardation Re of the film (C) and the in-plane retardation Re of the film (D), both measured at a wavelength of 550 nm, is from 250 to 300 nm.

23. A composite polarizer which comprises a polarizer and the retardation film of claim 22 laminated to the polarizer.

24. The retardation film according to claim 14 or 17, wherein a ratio of the retardation R650/R550 as measured at a wavelength of 650 nm to the retardation as measured at a wavelength of 550 nm is 1.0 or higher.

25. A composite polarizer which comprises a polarizer and the retardation film of claim 24 laminated to the polarizer.

26. A composite polarizer which comprises a polarizer and the retardation film of any one of claims 10, 11, 14, 15, 16, and 17 laminated to the polarizer.

27. An optical compensation film or an optical compensation layer, which is a film or a layer comprising a fumaric ester resin, wherein the film or the layer has three-dimensional refractive indexes satisfying the relationship nz>ny≥nx, wherein nx is the refractive index in a fast-axis direction of the film plane or the layer plane, ny is the refractive index in an in-plane direction perpendicular to the fast-axis direction, and nz is the refractive index in an out-of-plane vertical direction, wherein a ratio of the retardation R450/R550 as measured at a wavelength of 450 nm to the retardation as measured at a wavelength of 550 nm is 1.1 or lower, and wherein the film or the layer has an out-of-plane retardation Rth of −30 to −2,000 nm represented by the following expression (1), wherein d is a thickness of the film or the layer $$Rth=[(nx+ny)/2-nz]\times d \qquad (1).$$

28. An optical compensation film comprising:

an optical compensation film or an optical compensation layer (A) which comprises a fumaric ester resin, wherein the film or the layer has three-dimensional refractive indexes satisfying the relationship nz>ny≥nx, wherein nx is the refractive index in a fast-axis direction of the film plane or the layer plane, ny is the refractive index in an in-plane direction perpendicular to the fast-axis direction, and nz is the refractive index in an out-of-plane vertical direction, wherein a ratio of the retardation R450/R550 as measured at a wavelength of 450 nm to the retardation as measured at a wavelength of 550 nm is 1.1 or lower, and a film (B) which has three-dimensional refractive indexes satisfying the relationship ny>nx≤nz, wherein nx is the refractive index in a fast-axis direction of the film plane, ny is the refractive index in an in-plane direction perpendicular to the fast-axis direction, and nz is the refractive index in an out-of-plane vertical direction, wherein the film (B) has an in-plane retardation Re as measured at a wavelength of 550 nm and represented by the following expression (2), wherein d is a thickness of the film of 50 nm or larger $$Re=(ny-nx)\times d \qquad (2), \text{ and}$$

wherein the optical compensation film has an orientation parameter Nz represented by the following expression (3) in a range of −0.1 to 0.95

$$Nz=(ny-nz)/(ny-nx) \qquad (3).$$

* * * * *